(12) United States Patent
Eberle et al.

(10) Patent No.: US 7,639,037 B1
(45) Date of Patent: Dec. 29, 2009

(54) METHOD AND SYSTEM FOR SIZING FLOW CONTROL BUFFERS

(75) Inventors: Hans Eberle, Sunnyvale, CA (US); Nils Gura, Mountain View, CA (US); Wladyslaw Olesinski, Pleasanton, CA (US); Robert J. Drost, Los Altos, CA (US); Robert David Hopkins, Hayward, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 36 days.

(21) Appl. No.: 12/163,924

(22) Filed: Jun. 27, 2008

(51) Int. Cl.
*H03K 19/003* (2006.01)
(52) U.S. Cl. .............................. 326/21; 326/82; 326/101
(58) Field of Classification Search .................. 326/21, 326/26, 31, 82, 101
See application file for complete search history.

(56) References Cited

U.S. PATENT DOCUMENTS

| | | | | |
|---|---|---|---|---|
| 5,013,942 | A | * | 5/1991 | Nishimura et al. .......... 327/297 |
| 5,444,406 | A | * | 8/1995 | Horne ........................ 327/277 |
| 6,281,708 | B1 | * | 8/2001 | Kenny ......................... 326/86 |

OTHER PUBLICATIONS

Robert Drost et al., Proximity Communication, IEEE Journal of Solid-State Circuits, Sep. 2004, vol. 39, No. 9, pp. 1529-1535.

R. Drost et al., Challenges in Building a Flat-Bandwidth Memory Hierarchy for a Large-Scale Computer with Proximity Communication, IEEE Symposium on High Performance Interconnects, Standford, Aug. 17-19, 2005.

Yuval Tamir et al., High-Performance Multi-Queue Buffers for VLSI Communication Switches, ACM SIGARCH Computer Architecture News, vol. 16, issue 2, Jun. 1988, pp. 343-354.

M. Mizuno et al., Elastic Interconnects: Repeater-Inserted Long Wiring Capable of Compressing and Decompressing Data, IEEE International Solid-State Circuits Conference, ISSCC, San Francisco, Feb. 4-8, 2001.

Gregory L. Frazier et al., The Design and Implementation of a Multi-Queue Buffer for VLSI Communication Switches, Proceedings of the International Conference on Computer Design, Cambridge, Massachusetts, pp. 466-471 (Oct. 1989).

Tobias Bjerregaard et al., A Survey of Research and Practices of Network-on-Chip, ACM Computing Surveys, vol. 38, Mar. 2006, Article 1.

* cited by examiner

*Primary Examiner*—James Cho
(74) *Attorney, Agent, or Firm*—Osha • Liang LLP

(57) ABSTRACT

A system that includes a first buffer and a second buffer, wherein the first buffer and the second buffer are connected to the same input, wherein a size of the first buffer is defined by a distance of the first buffer from the input and a transfer rate of data, wherein a size of the second buffer is defined by a distance of the second buffer from the input and the transfer rate of data, and wherein the distance between the first buffer and the input is different from the distance between the second buffer and the input.

20 Claims, 19 Drawing Sheets

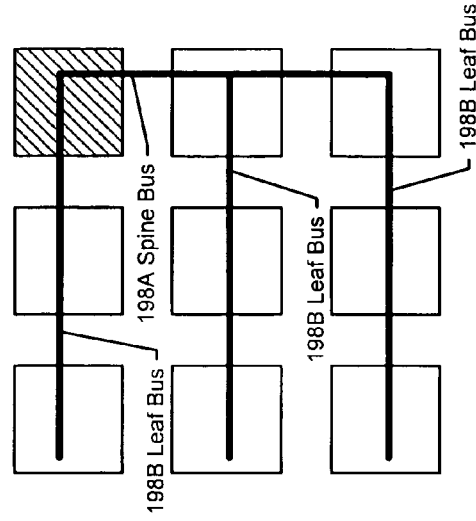
FIGURE 9B
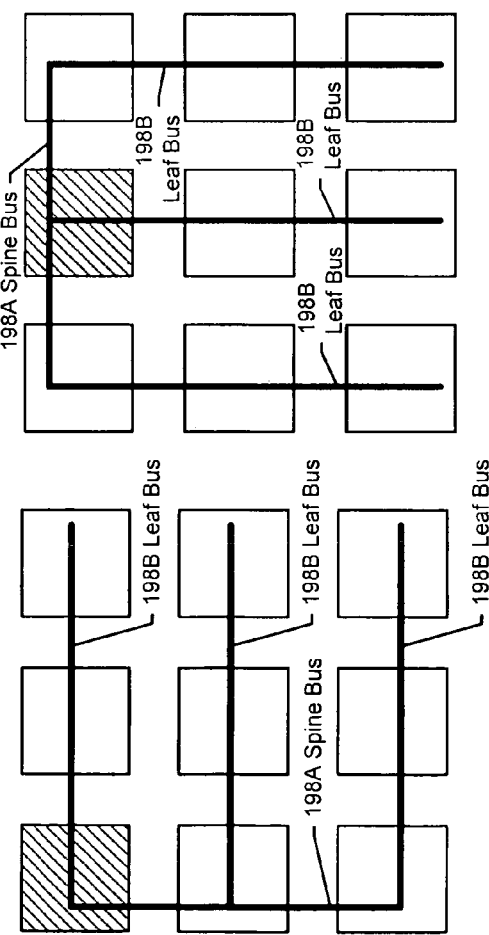
FIGURE 9C
FIGURE 9D
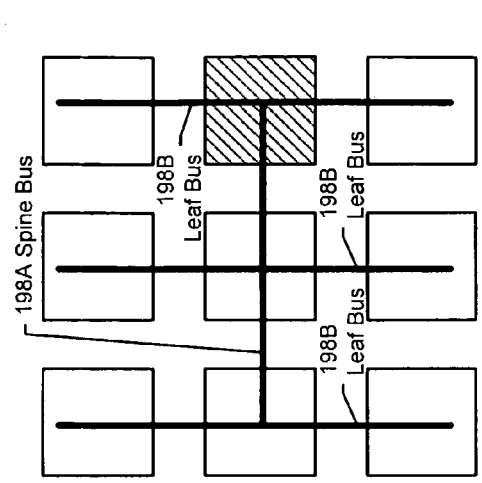
FIGURE 9E
FIGURE 9F
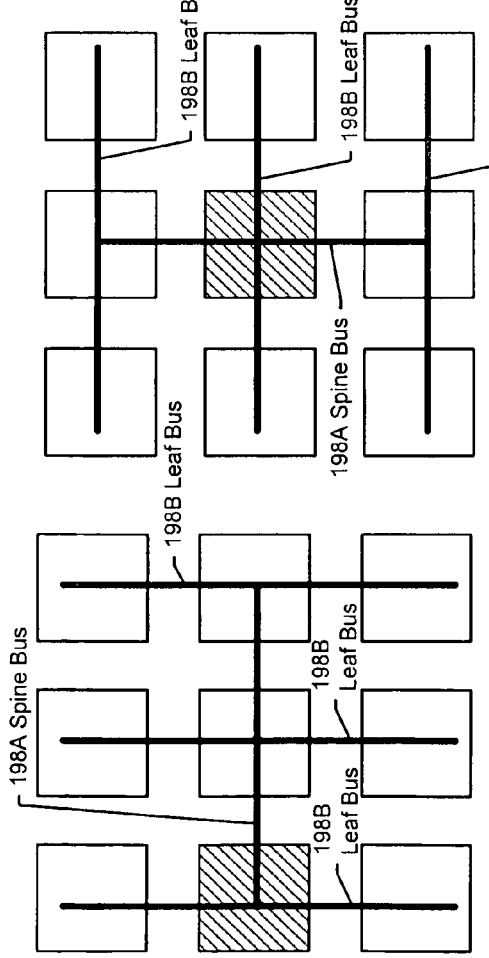
FIGURE 9G

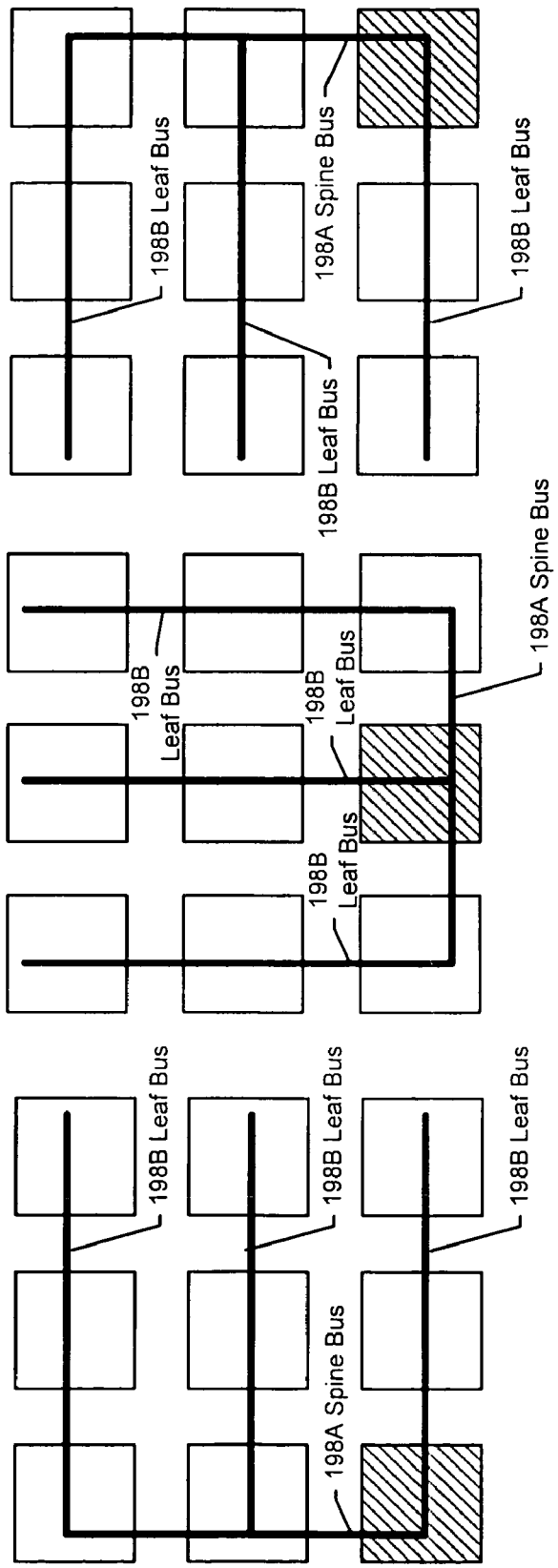

_US 7,639,037 B1_

METHOD AND SYSTEM FOR SIZING FLOW CONTROL BUFFERS

BACKGROUND

A typical computer system includes several components that are collectively used by a user to perform various functions such as preparing and generating a document with a word processor application. Specifically, the computer system may include an input and output portion, such as storage media, monitors, printers, keyboards, and other input/output devices as well as a computing portion.

The computing portion of a computer system typically includes various components such as, for example, a power supply, disk drives, and the electrical circuitry required to perform the necessary and requested operations of the computer system. The computing portion may also include a plurality of circuit boards on which various circuit components are implemented. For example, a computing portion designed with enhanced sound reproducing capabilities may include a circuit board dedicated to implementing circuitry that specifically operates to process data associated with the reproduction of sound.

Various chips are connected onto the circuit board. Those skilled in the art will recognize that the chips may be used to house and support various types of integrated circuits (e.g., application specific integrated circuits (ASICs), field-programmable gate arrays (FPGAs), microprocessors, and digital logic chips). The chips communicate with one another, i.e., pass data, using wires or traces of conductive material (e.g., copper or gold) embedded in the circuit board.

Different types of chips exist. For example, one type of chip is a crossbar switch, which is an electrical device used to connect and disconnect one or more inputs to one or more outputs at will. Between the input and the output is at least one flow control buffer. A flow control buffer creates a delay between transferring data from the input to the output. The delay allows the output inform the input when the output can or cannot accept data. In another example, another type of chip is a network on chip (NOC). The network connects multiple nodes for processing data. Each node has a corresponding flow control buffer. As with the crossbar switch, the flow control buffers on a NOC allow the core of a chip to control the flow of data to the core.

SUMMARY

In general, in one aspect, the invention relates to a multi-chip system that includes a first island chip that includes a first buffer, a second island chip that includes a second buffer, wherein the first buffer and the second buffer are connected to the same input port, wherein a size of the first buffer is defined by a distance of the first buffer from the input port and a transfer rate of data, wherein a size of the second buffer is defined by a distance of the second buffer from the input port and the transfer rate of data, and wherein the distance between the first buffer and the input port is different from the distance between the second buffer and the input port.

In general, in one aspect, the invention relates to a network-on-chip that includes a first node, a second node, and a third node. The third node includes a first buffer configured to receive data from the first node, wherein a size of the first buffer is defined by a distance to the third node from the first node and a transfer rate of data, and a second buffer configured to receive data from the second node, wherein a size of the second buffer is defined by a distance to the third node from the second node and the transfer rate of data, and wherein the size of the first buffer is different from the size of the second buffer.

In general, in one aspect, the invention relates to a method for fabricating an island chip of a plurality of island chips that includes identifying a rate of data transfer on the island chip, identifying a first distance to a first node on the island chip, wherein the first node comprises a first flow control buffer, identifying a second distance to a second node on the island chip, wherein the second node comprises a second flow control buffer, wherein the second distance is different from the first distance, defining a first size of the first flow control buffer according to the rate of data transfer and the first distance, defining a second size of the second flow control buffer according to the rate of data transfer and the second distance, wherein the second size is different from the first size, and creating the island chip with the first node having the first size of flow control buffer and the second node having the second size of flow control buffer, wherein the plurality of island chips are comprised in a multi-chip system.

Other aspects of the invention will be apparent from the following description and the appended claims.

DETAILED DESCRIPTION

Figure 1A:
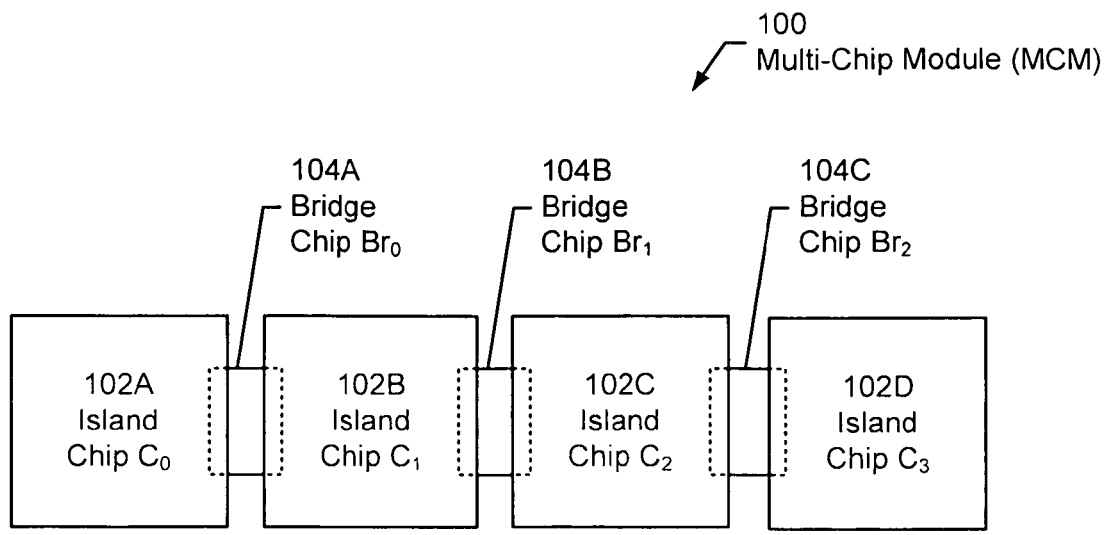
FIGS. 1A-1C show multi-chip modules in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and apparatus for performing flow control using flow control buffers. Specifically, the flow control may include sending control data to the input when the flow control buffers are at or close to full capacity or when data is removed from the flow control buffers. Embodiments of the invention account for the amount of data that may be sent to the flow control buffer during the time in which the control data is sent from the flow control buffer. Specifically, embodiments of the invention size flow control buffers on one or more chips according to the distance and the transfer rate of data to the flow control buffer. Thus, different flow control buffers on the same chip may be different sizes because of the difference in the distances to the buffers.

In one or more embodiments of the invention, the flow control buffers are located on a multi-chip system. A multi-chip system is a configuration of multiple physical chips. A multi-chip system includes multiple island chips that are connected. The island chips may be connected by bridge chips, cables, board traces, optical links, or other types of connection mechanisms. In other embodiments, the island chips connect directly to one or more island chips. In one or more embodiments of the invention, the multi-chip system is a multi-chip module (MCM). A MCM is a single package having multiple chips. For example, the multiple chips may be located on the same substrate. A MCM includes island chips and bridge chips.

The island chips include functionality to perform the operations of the MCM. The bridge chips include functionality to connect island chips. Specifically, the bridge chips include functionality to provide an input path between the island chips. In one or more embodiments of the invention, the bridge chips are smaller than the island chips and require less power than the island chips. Embodiments of the invention may configure the input path on the MCM such that for each level of flow control buffer, the flow control buffers have identical or nearly identical sizes. Thus, the chips on the MCM may be identically fabricated.

Figure 1B:
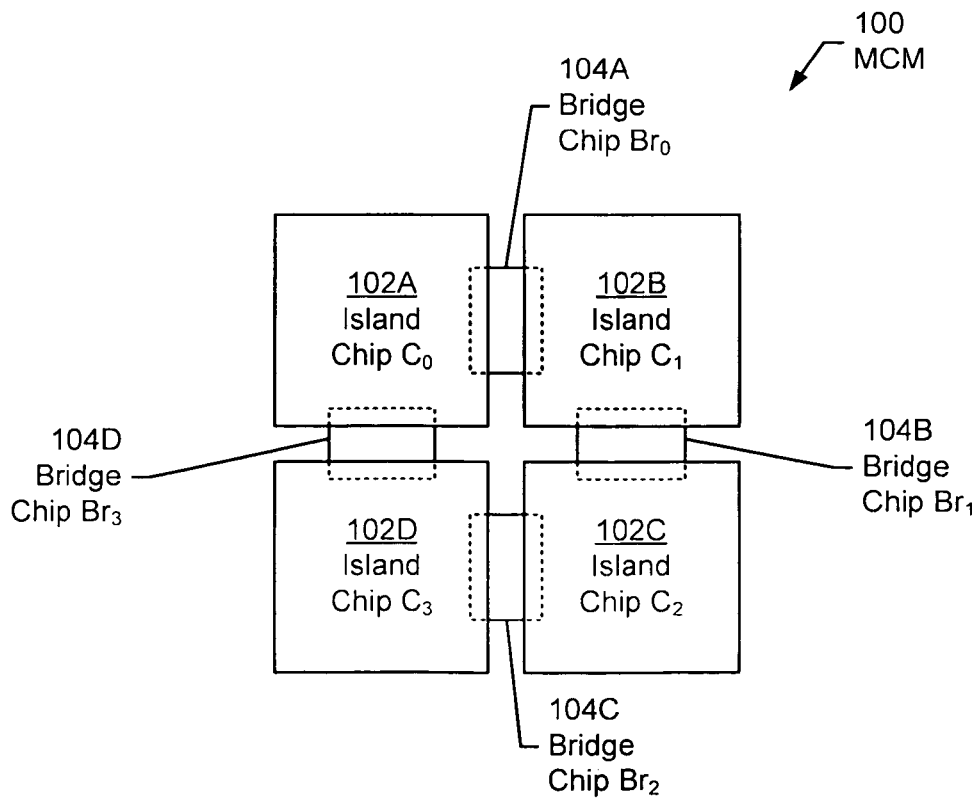
Figure 1C:
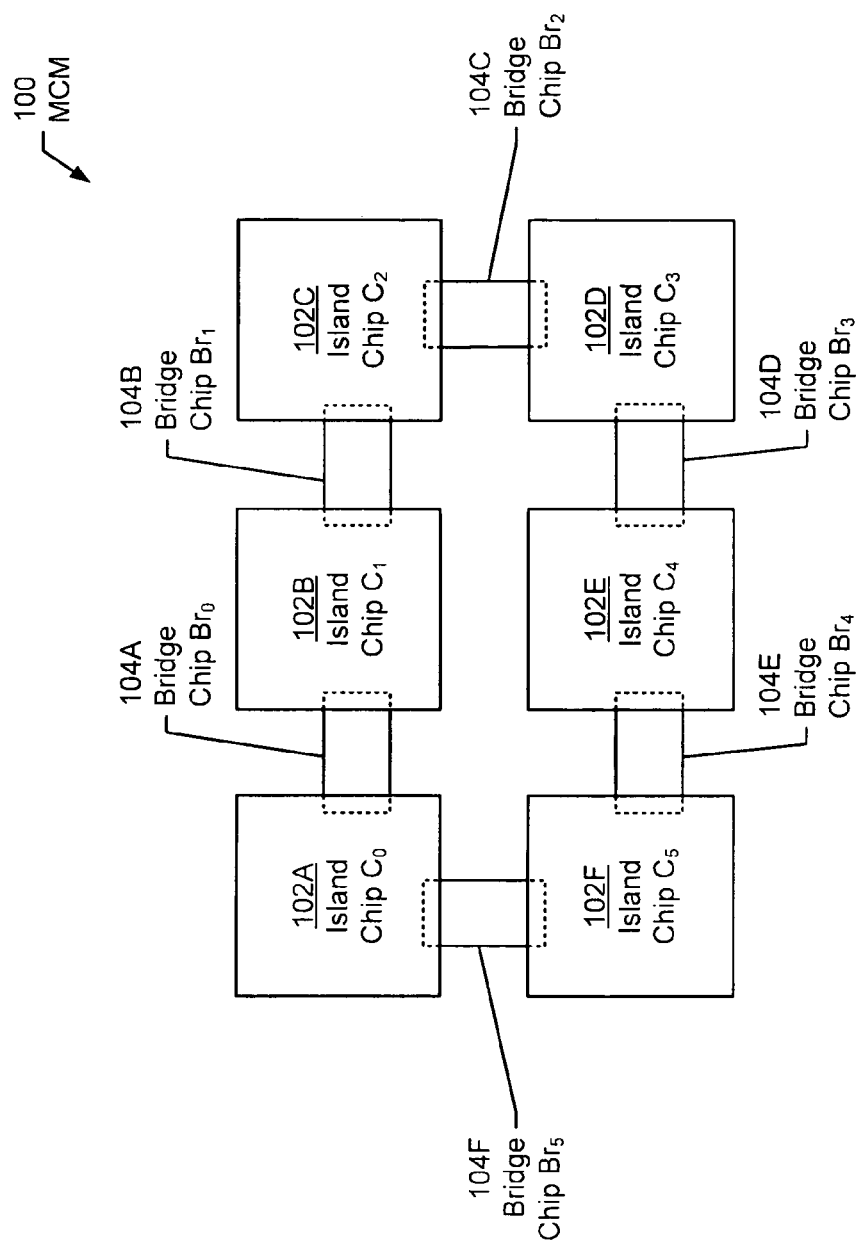

FIGS. 1A-1C show arrangements of MCMs (100) in accordance with one or more embodiments of the invention. FIG. 1A shows a schematic diagram of a MCM (100) arranged in a vector layout. As shown in FIG. 1A, the island chips (102) and the bridge chips (104) are arranged in a row. In some embodiments of the invention, in the vector layout, each bridge chip (104) connects exactly two island chips (102). In other embodiments of the invention, each bridge chip (104) connects more than two island chips (102). Further, the opposite sides of a single island chip (102) are connected to the bridge chips (104). For example, bridge chip $Br_0$ (104A) connects island chip $C_0$ (102A) and island chip $C_1$ (102B). The opposite side of island chip $C_1$ (102B) is connected by bridge chip $Br_1$ (104B) to island chip $C_2$ (102C). Similarly, the opposite side of island chip $C_2$ is connected by bridge chip $Br_2$ to island chip $C_3$ (102D) as shown in FIG. 1A.

FIG. 1B shows a schematic diagram of a MCM (100) arranged in a matrix layout. As shown in FIG. 1B, in the matrix layout, adjacent sides of the island chips (102) are connected to bridge chips (104). For example, as shown in FIG. 1B, adjacent sides of island chip $C_0$ (102A) are connected to bridge chip $Br_0$ (104A) and bridge chip $Br_3$ (104D). Similarly, adjacent sides of island chip $C_1$ (102B) are connected to bridge chip $Br_0$ (104A) and bridge chip $Br_1$ (104B). Adjacent sides of island chip $C_2$ (102C) are connected to bridge chip $Br_1$ (104B) and bridge chip $Br_2$ (104C). Adjacent sides of island chip $C_3$ (102D) are connected to bridge chip $Br_2$ (104C) and bridge chip $Br_3$ (104D). Thus, island chip $C_0$ (102A) can communicate through a single bridge chip with island chip $C_1$ (102B) and through a single bridge chip with island chip $C_3$ (102D). Island chips $C_1$ (102B) and island chip $C_3$ (102D) can communicate with each other indirectly through island chip $C_2$ (102C) or island chip $C_0$ (102A) requiring traversal of two bridge chips (104).

Although FIGS. 1A-1B show four island chips (102) and three or four bridge chips (104), respectively, more or fewer bridge chips and/or island chips may be used without departing from the scope of the invention. For example, the sides of the island chip (102) not shown as connected to a bridge chip in FIG. 1A or 1B, may be connected to a bridge chip in accordance with one or more embodiments of the invention. Similarly, more island chips (102) and bridge chips (104) may be added to the configuration shown in FIG. 1C without departing from the scope of the invention. For example, the MCM (100) shown in FIG. 1A, 1B, or 1C may be repeated across an entire substrate in the computer system.

Further, although FIGS. 1A-1B show two possible arrangements for the MCM (100), the MCM may be arranged in alternative configurations. For example, rather than having the four bridge chips as shown in FIG. 1B, the MCM may be configured with a single bridge chip in the center of the island chips and connected to a corner of each of the island chips.

FIG. 1C shows a schematic diagram of a MCM (100) arranged in a ring. As shown in FIG. 1C, in the ring, two sides of each island chip (102) are connected to bridge chips (104). For example, as shown in FIG. 1C, adjacent sides of island chip $C_0$ (102A) are connected to bridge chip $Br_0$ (104A) and bridge chip $Br_5$ (104F). Similarly, adjacent sides of island chip $C_1$ (102B) are connected to bridge chip $Br_0$ (104A) and bridge chip $Br_1$ (104B). Adjacent sides of island chip $C_2$ (102C) are connected to bridge chip $Br_1$ (104B) and bridge chip $Br_2$ (104C). Adjacent sides of island chip $C_3$ (102D) are connected to bridge chip $Br_2$ (104C) and bridge chip $Br_3$ (104D). Adjacent sides of island chip $C_4$ (102E) are connected to bridge chip $Br_3$ (104D) and bridge chip $Br_4$ (104E). Adjacent sides of island chip $C_5$ (102F) are connected to bridge chip $Br_4$ (104E) and bridge chip $Br_5$ (104F). In the ring, only two sides of an island chip are connected to bridge chips.

In one or more embodiments of the invention, communication between island chips and bridge chips is performed using proximity communication. The proximity communication may be used to improve data throughput. Proximity communication is based on the observation that an interconnect that uses capacitively coupled chip-to-chip connections is orders of magnitude denser than an interconnect that uses off-chip wires. Because capacitively coupled chip-to-chip connections are closer in scale to on-chip wires, far denser, higher bandwidth communication is enabled. Further, without chips permanently attached, faulty chips may be replaced on the MCM. MCMs that are positioned for proximity communication are arranged such that transmitting and receiving circuits in the integrated circuits are aligned with only microns of distance between them in accordance with one or more embodiments of the invention.

Figure 2A:
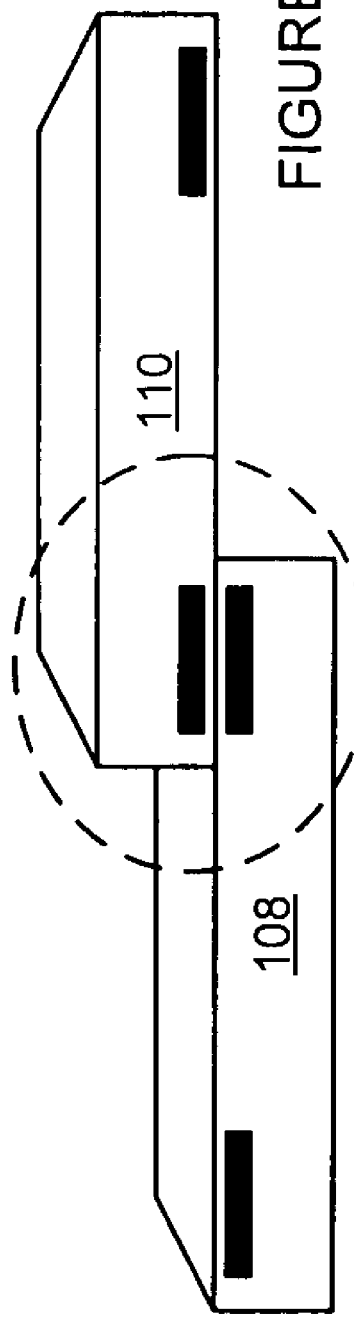
FIGS. 2A-2B show a schematic diagram of components for proximity communication in accordance with one or more embodiments of the invention.
Figure 2B:
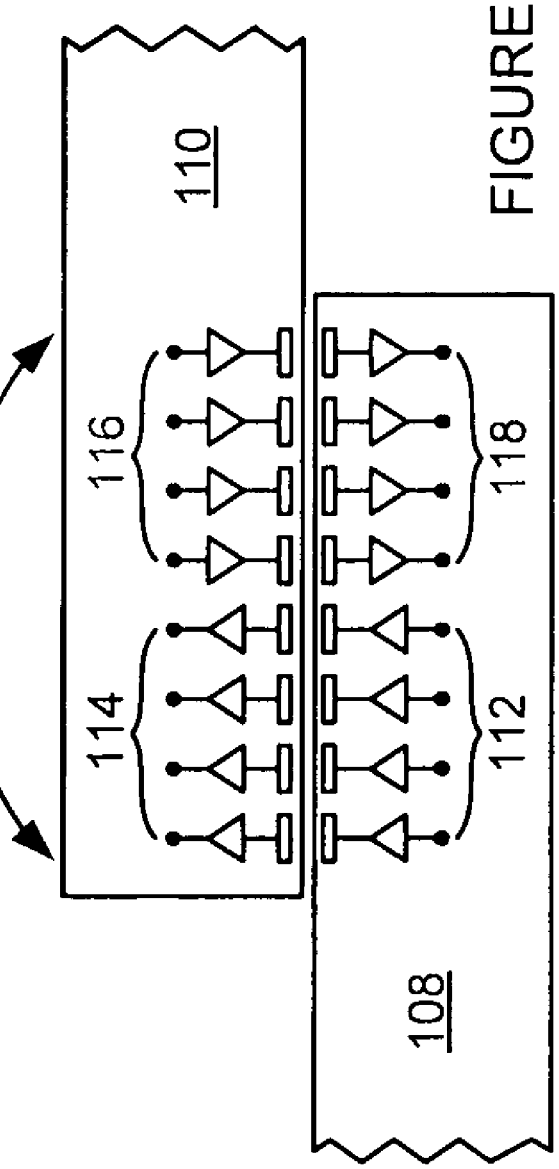

FIGS. 2A-2B show a schematic diagram of components for proximity communication in accordance with one or more embodiments of the invention. In FIGS. 2A and 2B, a first chip 108 is positioned for proximity communication with a second chip (110). Using capacitive coupling, data is capable of being transferred (i) from transmitting circuits (112) of the first chip (108) to receiving circuits (114) of the second chip (110) and (ii) from transmitting circuits (116) of the second chip (110) to receiving circuits (118) of the first chip (108). The transmitting circuits (112, 116) and the receiving circuits (114, 118) may each have microscopic metal pads. A pair of transmitting and receiving pads form a plate capacitor whereby voltage changes on the transmitting pad cause voltage changes on the receiving pad. By using capacitive coupling between chips (108, 110) to transfer data, pins and wires that would otherwise be needed to transfer data between the chips (108, 110) are not required. Further, for proximity communication, the coupling may be inductive or optical.

Figure 3:
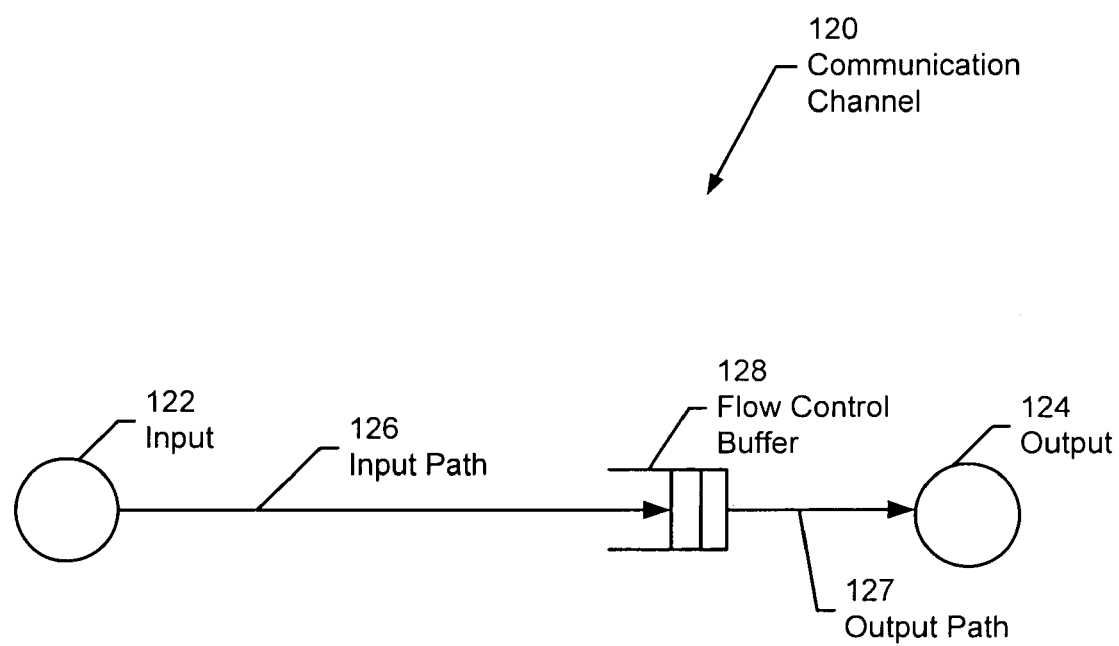
FIGS. 3-11 show schematic diagrams in accordance with one or more embodiments of the invention.

FIGS. 3-11 show schematic diagrams in accordance with one or more embodiments of the invention. FIG. 3 shows a schematic diagram of a communication channel (120) in accordance with one or more embodiments of the invention. As shown in FIG. 3, a communication channel (120) includes an input (122) and an output (124). The input (122) includes functionality to produce data. Conversely, the output (124) includes functionality to consume data.

An input path (126) connects the input (122) to a flow control buffer (128). An output path connects the flow control buffer (128) to the output (124). The input path (126) may be achieved through wire and/or wireless communication. Further, in one or more embodiments of the invention, the input path (126) is bi-directional. Specifically, the input (122) includes functionality to transmit input data for use by the output (124) and receive control data from the flow control buffer (128) using the input path (126). In one or more embodiments of the invention, the control data may include receive acknowledgements and flow control data. The control data identifies when the output (124) can receive data from the input (122).

A flow control buffer (128) is interposed between the input (122) and the output (124). A flow control buffer (128) includes functionality to temporarily store data. Specifically, the flow control buffer (128) provides a delay in the communication between the input (122) and the output (124).

As discussed above, the size of the flow control buffer (128) is based on the distance and the transfer rate of data to the flow control buffer (128). Specifically, the size of the flow control buffer is proportional to the duration of time for performing a round trip of receiving input data from the input (122) and sending control data to the input (122). The duration of time to perform a round trip may be denoted as the round trip time, "$T_{rt}$". The round trip time may be calculated using the equation, $T_{rt}=t_1+t_2+t_3$, in which $t_1$ is the duration of time for data to be transmitted from the input (122) to the flow control buffer (124), $t_2$ is the duration of time for control data to be generated, and $t_3$ is the duration of time for control data to be transmitted to the input (122).

Different schemes may be used for flow control. The actual size of the flow control buffer is dependent on the scheme used for flow control in accordance with one or more embodiments of the invention. For example, the flow control may be a $X_{on}/X_{off}$ scheme. In the $X_{on}/X_{off}$ scheme, the control data is $X_{on}$ and $X_{off}$ signals. The $X_{on}$ signal indicates to the input (122) that the flow control buffer (128) has empty storage space to receive data. The $X_{off}$ signal indicates to the input (122) that the flow control buffer (128) has a threshold amount of data in the flow control buffer (128) and therefore is almost full. The flow control buffer (128) is full when the flow control buffer (128) does not have storage capacity for additional data. When the flow control buffer (128) is full, the flow control buffer (128) cannot receive additional data.

In one or more embodiments of the invention, the flow control buffer (128) or output (124) include functionality to generate the $X_{off}$ signal when the amount of data stored in the flow control buffer (128) exceeds a full threshold of stored data in the flow control buffer (128). In one or more embodiments of the invention, the full threshold accounts for the amount of input data on the input path (126), the amount of input data that is generated and placed on the input path (126) while control data is generated, and the amount of input data generated and placed on the path while the control data is being sent to input (122). Thus, the full threshold is pre-defined such that the amount of data that can be stored after the full threshold is exceeded is at least $T_{rt}$ multiplied by the transfer rate of data to the flow control buffer (128).

Similarly, the flow control buffer (128) may include functionality to generate the $X_{on}$ signal when the amount of data stored in the flow control buffer (128) exceeds an empty threshold of stored data in the flow control buffer (128). The empty threshold ensures that data is always in the flow control buffer (128) and available for consumption by the output (124). The empty threshold is pre-defined such that the amount of data that is stored when the empty threshold is exceeded is at least $T_{rt}$ multiplied by the transfer rate of data to the flow control buffer (128). If the drain rate (i.e., the amount of data that can be consumed by the output (124)) is specified, the transfer rate of data may be reduced by the amount of the drain rate.

Another example scheme for flow control is credit based. In the credit based scheme, the input (122) tracks the number of credits available in a credit counter in accordance with one or more embodiments of the invention. Each time the input (122) sends a unit of data, the input (122) decrements the credit counter. Each time the output (124) consumes a unit of data, the output sends control data to the input (122) to indicate that an additional credit is available. In response, the input increments the credit counter. In the credit based scheme, only an empty threshold is required. The empty threshold is set as discussed above in accordance with one or more embodiments of the invention. The number of allocated credits may be set greater than or equal to the empty threshold to ensure that data is in the flow control buffer and available for consumption by the output.

Embodiments size the flow control buffer (128) based on the flow control scheme used. Specifically, the size of the flow control buffer is the buffer capacity to store the full threshold amount of data and/or the empty threshold amount of data. For example, in the $X_{on}/X_{off}$ scheme, the size of the flow control buffer (128) is at least the empty threshold plus the full threshold. In another example, in the credit based scheme, the buffer capacity is at least the empty threshold. In the description below, the amount of data capacity available once the full threshold is exceeded and the amount of data remaining once the empty threshold is exceeded are both referred to as the threshold size.

Figure 4:
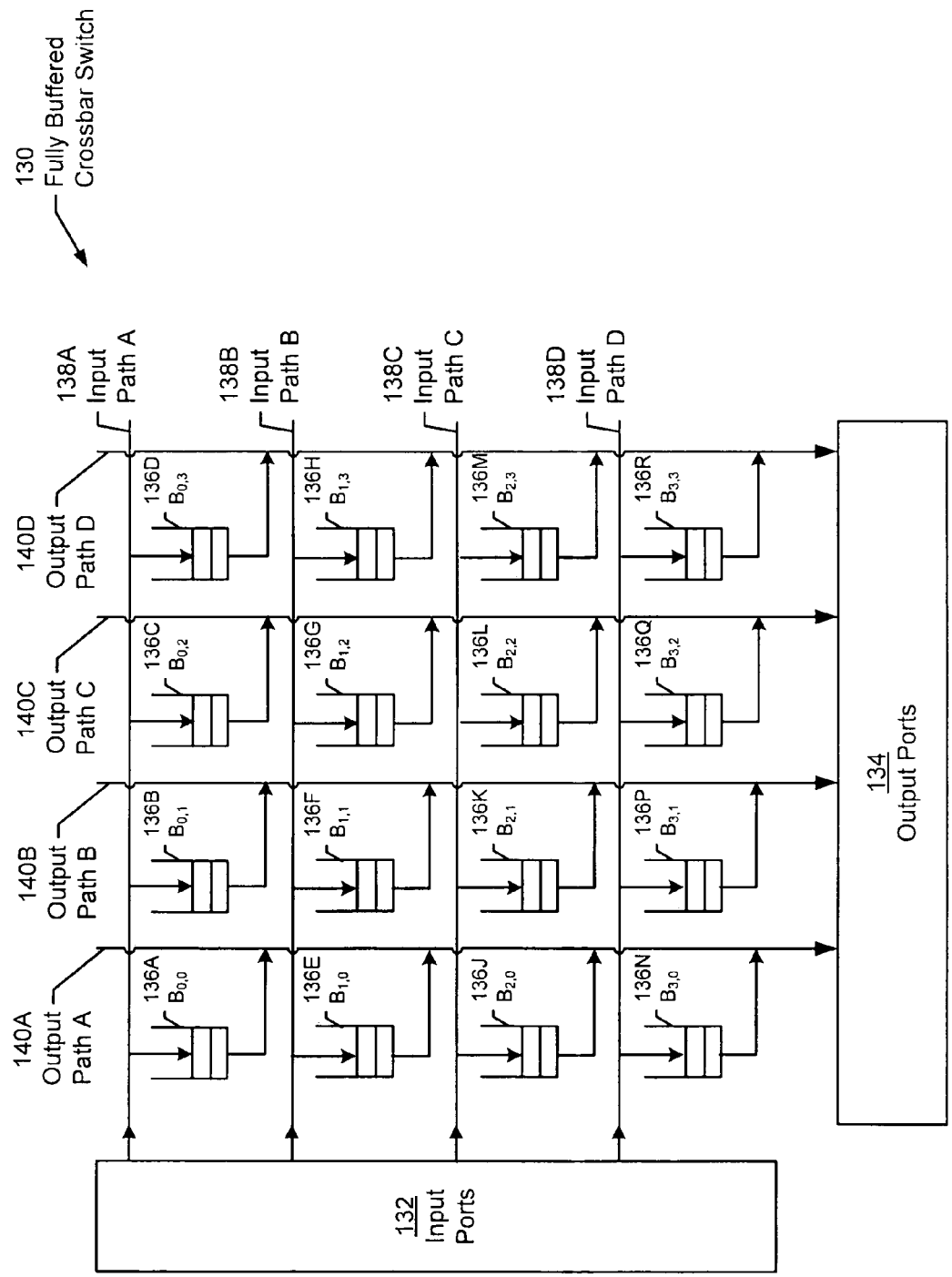

FIG. 4 shows a fully buffered crossbar switch (130) in accordance with one or more embodiments of the invention. The input for the fully buffered crossbar switch is provided by input ports (132). In particular, each input path (138) has a separate input port (132) in accordance with one or more embodiments of the invention. The output for the fully buffered crossbar switch is provided by the output ports (134). Each output path (140) includes a separate output port.

As shown in FIG. 4, a fully buffered crossbar switch (130) is a crossbar switch with flow control buffers (136) at each cross point. The cross points are the locations on the switch in which input paths (138) are connected to the output paths (140). In one or more embodiments of the invention, a flow control buffer (136) exists at the connection between the input path (138) and the output path (140). Specifically, data from each input path (138) flows through a flow control buffer (136) to get to an output path. For example, data from input path A (138A) may flow through flow control buffer $B_{0,0}$ (136A) to output path A (140A), through flow control buffer $B_{0,1}$ (136B) to output path B (140B), through flow control buffer $B_{0,2}$ (136C) to output path C (140C), through flow control buffer $B_{0,3}$ (136D) to output path D (140D). In another example, data from input path D (138D) may flow through flow control buffer $B_{3,0}$ (136N) to output path A (140A), through flow control buffer $B_{3,1}$ (136P) to output path B (140B), through flow control buffer $B_{3,2}$ (136Q) to output path C (140C), through flow control buffer $B_{3,3}$ (136R) to output path D (140D).

In one or more embodiments of the invention, input data is added to the flow control buffers (136) based on the availability of data and when the flow control buffer can receive data. Specifically, the input may place the data on the bus when the data is available for a particular flow control buffer (136). The flow control buffer (136) may obtain data from the bus when the address associated with the data matches the address associated with the flow control buffer. As discussed above, the input may maintain information and a queue for each flow control buffer. When the control data indicates that the buffer can receive packets and data is available from the queue, then the input may dispatch data from the queue to the bus for the flow control buffer.

In one or more embodiments of the invention, output data is extracted from the flow control buffers (136). In one or more embodiments of the invention, the output data may be extracted based on a schedule. For example, the output data may be extracted in a round-robin scheme.

The size of each flow control buffer (136) in FIG. 4 may be configured according to the input path length to the flow control buffer (136) as discussed above. For the following discussion with respect to FIGS. 4-11, consider the scenario in which the crosspoints and associated flow control buffers are uniformly spaced such that the difference in the round trip time between any adjacent flow control buffers is the same duration or unit of time, "$T_{unit}$". Further, in the discussion, consider the scenario in which the round trip time between the input port (132) and the first flow control buffer (e.g., $B_{0,0}$ (136A), $B_{1,0}$ (136E), $B_{2,0}$ (136J), and $B_{3,0}$ (136N)) is also $T_{unit}$ and the transfer rate of data is uniform.

Those skilled in the art will appreciate that the above assumptions are to simplify the description. In actuality the assumptions may or may not be made when sizing the flow control buffers. In order to size the flow control buffers according to the actual distance and to account for the different transfer rates of data, then the size may be identified by determining for each portion of the input path, the transmission rate of input data multiplied by $t_1$ plus the transmission rate of input data multiplied by $t_2$ plus the transmission rate of input data multiplied by $t_3$, where $t_1$ is the amount of time for the input data to flow through the portion, where $t_2$ is the amount of time to generate the control data, and $t_3$ is the amount of time for control data to flow through the portion. By summing the amount of data for the portions to create a sum, and adding to the sum the amount of input data generated while generating the control data, the full threshold and empty threshold may be identified.

Continuing with the assumptions and FIG. 4 and assuming credit based flow control, if the flow control buffers are uniformly spaced and the round trip time between the input port and the first flow control buffer is the same as the round trip time between adjacent buffers and is equal to $T_{unit}$, then $T_{rt}$ from the input ports (132) to the first flow control buffer (e.g., $B_{0,0}$ (136A), $B_{1,0}$ (136E), $B_{2,0}$ (136J), and $B_{3,0}$ (136N)) is $1*T_{unit}$; to the second flow control buffer (e.g., $B_{0,1}$ (136B), $B_{1,1}$ (136F), $B_{2,1}$ (136K), and $B_{3,1}$ (136P)) is $2*T_{unit}$; to the third flow control buffer (e.g., $B_{0,2}$ (136C), $B_{1,2}$ (136G), $B_{2,2}$ (136L), and $B_{3,2}$ (136Q)) is $3*T_{unit}$; and to the fourth flow control buffer (e.g., $B_{0,3}$ (136D), $B_{1,3}$ (136H), $B_{2,3}$ (136M), and $B_{3,3}$ (136R)) is $4*T_{unit}$. Therefore, if the transfer rate is R, the threshold size for the first buffers may be set to $1*T_{unit}*R$; the threshold size for the second buffers may be set to $2*T_{unit}*R$; the threshold size for third buffers may be set to $3*T_{unit}*R$; and threshold size for the fourth buffers may be set to $4*T_{unit}*R$. As discussed above with reference to FIG. 3, the threshold size may be used to identify the flow control buffer size. By sizing the flow control buffers non-uniformly rather than uniformly according to the largest threshold size, embodiments of the invention save at least $24*T_{unit}*R$ in buffer capacity for the fully buffered crossover switch shown in FIG. 4 in accordance with one or more embodiments of the invention. In general, in one or more embodiments of the invention, total buffer capacity may be reduced over the uniform configuration of buffer capacity by approximately one half by sizing the flow control buffers according to the distance to the input ports (132).

Those skilled in the art will appreciate that different schemes may be used to add and extract data from the flow control buffers. Further, although FIG. 4 shows only four input paths (138) and four output paths (140), more or fewer input paths and output paths may be used without departing from the scope of the invention.

Figure 5:
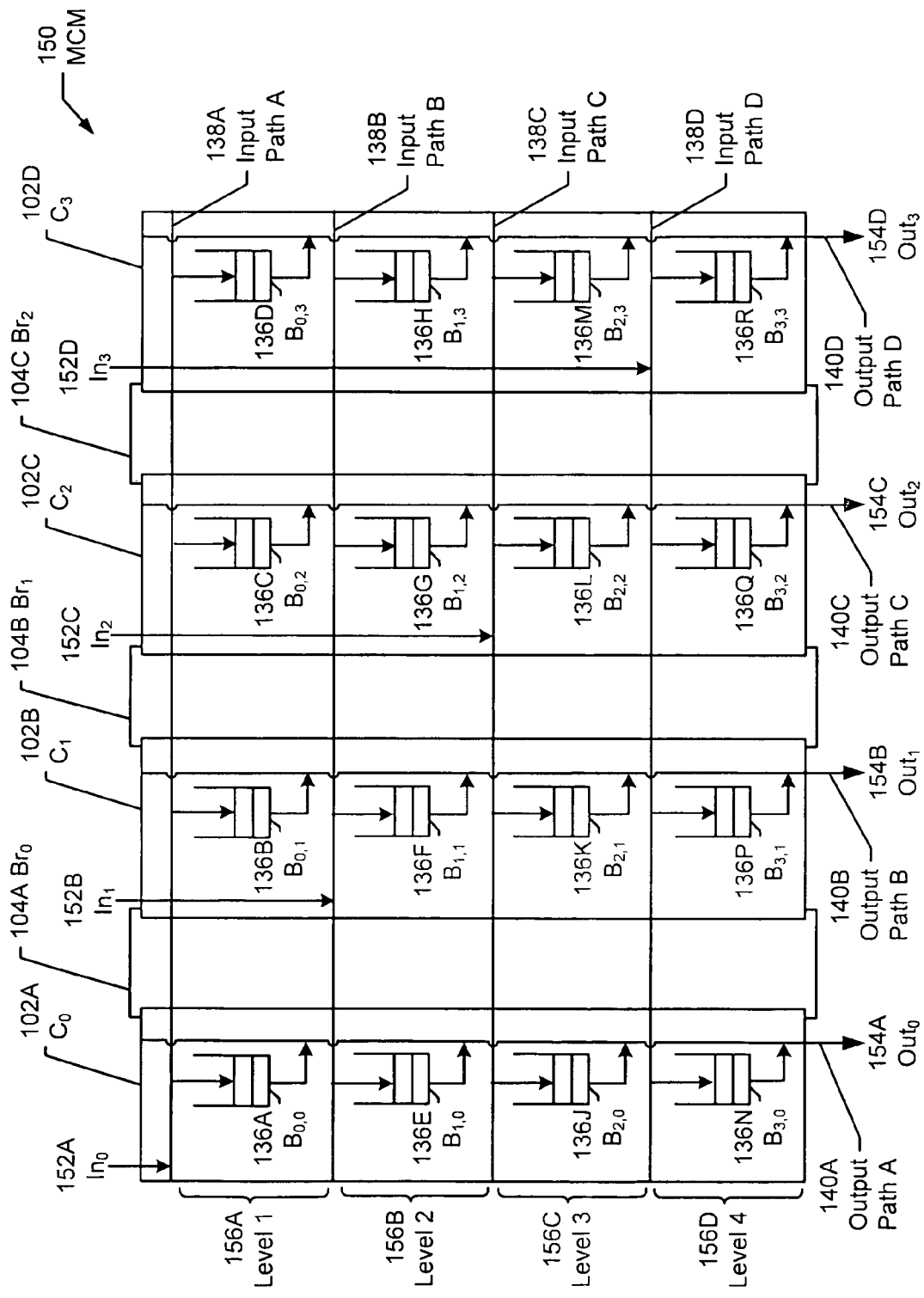

FIG. 5 shows a fully buffered crossbar switch implemented on a MCM (150) arranged in a vector layout in accordance with one or more embodiments of the invention. Although FIG. 5 shows only four island chips (102), three bridge chips (104), four input paths (138), and four output paths (140), more or fewer island chips, bridge chips, input paths, and output paths may be used without departing from the scope of the invention.

As shown in FIG. 5, the flow control buffers (136) are located on the island chips (102) and are interposed between the input ports (152) and the output ports (154). The bridge chips (104) include functionality to provide connectivity for the input paths (138) across the multiple island chips. In the configuration shown in FIG. 5, the input path (138) remains on the same level across each of the chips. For example, input path A (138A) provides input data to level 1 (156A) flow control buffers (e.g., $B_{0,0}$ (136A), $B_{0,1}$ (136B), $B_{0,2}$ (136C), and $B_{0,3}$ (136D)). Similarly, input path B (138B) provides input data to level 2 (156B) flow control buffers (e.g., $B_{0,0}$ (136A), $B_{0,1}$ (136B), $B_{0,2}$ (136C), and $B_{0,3}$ (136D)).

In the configuration shown in FIG. 5, each input port (152) starts providing input data to a different island chip (102). For example, the closest flow control buffer for input port $In_0$ (152A) is $B_{0,0}$ (136A); the closest flow control buffers for input port $In_1$ (152B) are $B_{1,1}$ (136F) and $B_{1,0}$ (136E) the closest flow control buffers for input port $In_2$ (152C) are $B_{2,2}$ (136L) and $B_{2,1}$ (136F); and the first input buffer for input port $In_3$ (152D) is $B_{3,3}$. Although not shown in FIG. 5 and in the subsequent Figures, each island chip (102) may have more than one input port (152) and more than one output port (154) without departing from the scope of the invention.

Further, in the configuration shown in FIG. 5, the threshold size for the flow control buffers $B_{0,0}$ (136A), $B_{1,0}$ (136E), $B_{2,0}$ (136J), and $B_{3,0}$ (136N) may be set to $1*T_{unit}*R$, $2*T_{unit}*R$, $3*T_{unit}*R$, and $4*T_{unit}*R$, respectively. The threshold sizes for flow control buffers $B_{0,1}$ (136B), $B_{1,1}$ (136F), $B_{2,1}$ (136K), and $B_{3,1}$ (136P) may be set to $2*T_{unit}*R$, $1*T_{unit}*R$, $2*T_{unit}*R$, and $3*T_{unit}*R$, respectively. The threshold sizes for flow control buffers $B_{0,2}$ (136C), $B_{1,2}$ (136G), $B_{2,2}$ (136L), and $B_{3,2}$ (136Q) may be set to $3*T_{unit}*R$, $2*T_{unit}*R$, $1*T_{unit}*R$, and $2*T_{unit}*R$, respectively. The threshold sizes for flow control buffers $B_{0,3}$ (136D), $B_{1,3}$ (136H), $B_{2,3}$ (136M), and $B_{3,3}$ (136R) may be set to $4*T_{unit}*R$, $3*T_{unit}*R$, $2*T_{unit}*R$, and $1*T_{unit}*R$, respectively. Therefore, the threshold size required for the configuration shown in FIG. 5 is $36*T_{unit}*R$ in accordance with one or more embodiments of the invention. Accordingly, the total size for the flow control buffers in the configuration shown in FIG. 5 may be between $36*T_{unit}*R$ and $72*T_{unit}*R$ depending on the flow control scheme used. Those skilled in the art will appreciate that the total size may be a minimum size. For example, the size of the flow control buffers may be increased based on implementation constraints, to simplify control logic, to allow for possible design changes, to account for safety margins with respect to the clock, based on library functions, and for other reasons. In one or more embodiments of the invention, the flow control buffer sizes of each of the island chips are not identical. Specifically, flow control buffers on the same row on different chips may not be identical because of the different distances from the respective input port to the flow control buffer.

Figure 6:
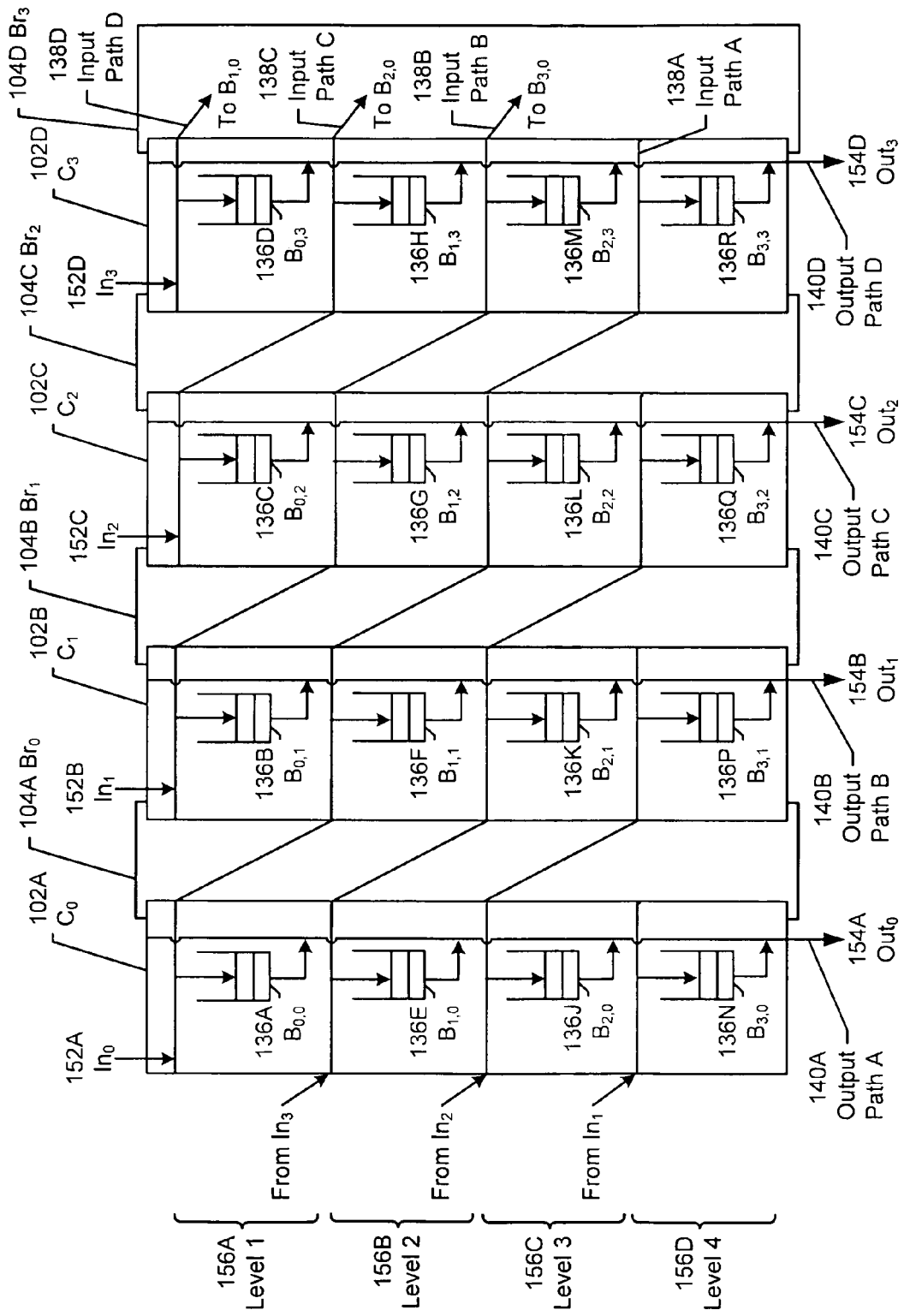

FIG. 6 shows a configuration of a fully buffered crossbar switch arranged as a ring in accordance with one or more embodiments of the invention. A possible MCM topology is described above and in FIG. 1B. Although FIG. 6 shows only four island chips (102), four bridge chips (104), four input paths (138), and four output paths (140), more or fewer island chips, bridge chips, input paths, and output paths may be used without departing from the scope of the invention.

In one or more embodiments of the invention, the configuration shown in FIG. 6 may be used when the wiring is fixed. The wires are fixed when the connectivity of the input to the buffers and to the output is permanent. In the diagram shown in FIG. 6, bridge chip $Br_3$ (104D) connects island chip $C_3$ (102D) with island chip $C_0$ (102A).

In the configuration shown in FIG. 6, each bridge chip (104) includes functionality to lower each input path (138) by one level (156). For example, input path A (138A) starts from input port $In_0$ (152A) to a level 1 (156A) flow control buffer $B_{0,0}$ (136A). The input path A (138A) continues to bridge chip $Br_0$ (104A). Bridge chip $Br_0$ (104A) moves the input path A (138A) to a level 2 (156B) flow control buffer $B_{1,1}$ (136F). The input path A (138A) continues through bridge chip $Br_1$ (104B) to a level 3 (156C) flow control buffer $B_{2,2}$ (136L), and through bridge chip $Br_2$ (104C) to a level 4 (156D) flow control buffer $B_{3,3}$ (136R). Similarly, as shown in FIG. 6, input path B (138B), input path C (138C), and input path D (138D) each lower a level (156) from one island chip (102) to the adjacent island chip (102).

The configuration shown in FIG. 6 allows each island chip (102) to be identical while having flow control buffer sizes according to the distance to the flow control buffer (136) and the transfer rate of data. Specifically, because the flow control paths each start on the level 1 (156A), then connect to level 2 (156B), then connect to level 3 (136C) and then to level 4 (136D), the threshold sizes of the flow control buffers may be $1*T_{unit}*R$, $2*T_{unit}*R$, $3*T_{unit}*R$, and $4*T_{unit}*R$ for each level, respectively, on each island chip (102). Thus, in one or more embodiments of the invention, the island chips may be identically fabricated.

Figure 7A:
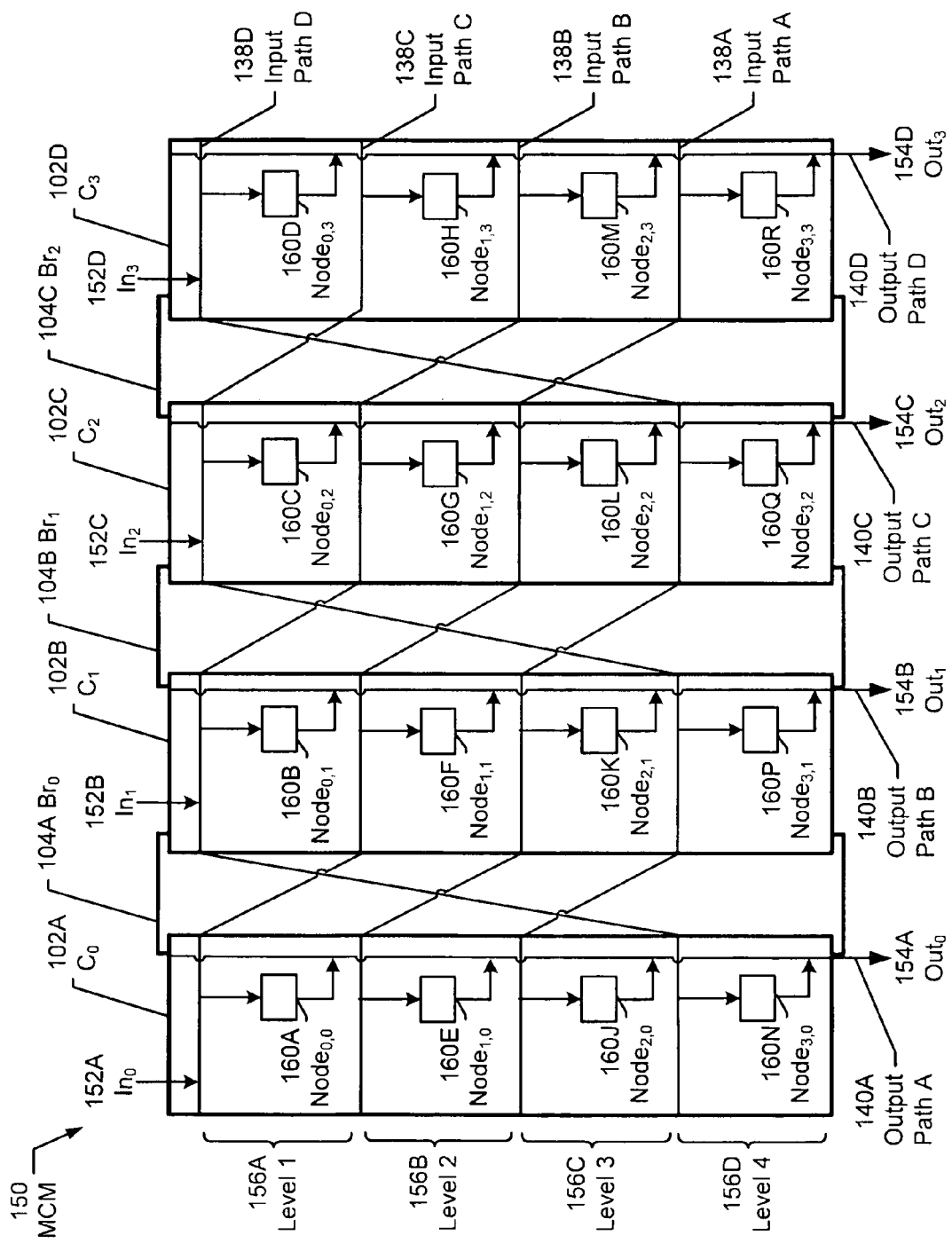
Figure 7B:
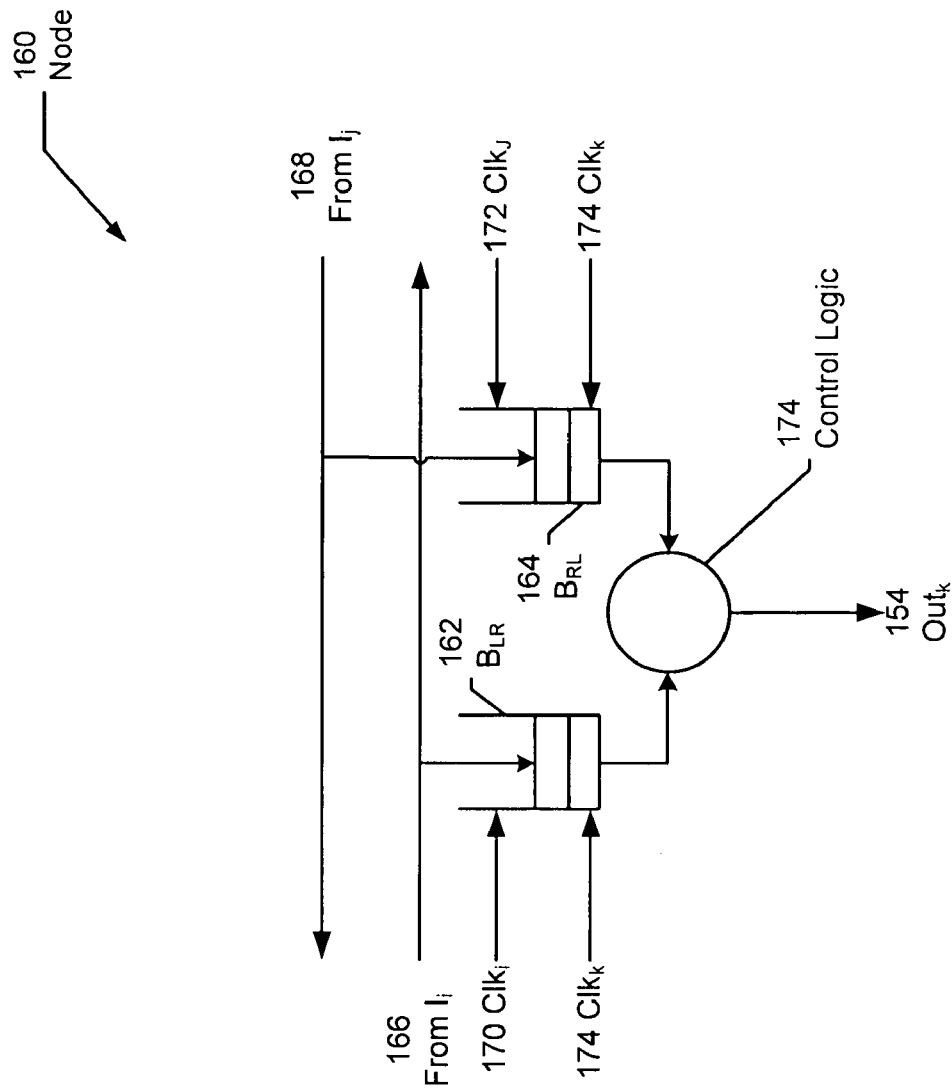

FIGS. 7A-7B show a fully buffered crossbar switch arranged in a vector layout in accordance with one or more embodiments of the invention. For example, one possible vector layout is discussed above and in FIG. 1A. In one or more embodiments of the invention, the configuration shown in FIGS. 7A-7B may be used, for example, when the wiring is fixed. Although FIG. 7A shows only four island chips (102), three bridge chips (104), four input paths (138), and four output paths (140), more or fewer island chips, bridge chips, input paths, and output paths may be used without departing from the scope of the invention.

FIG. 7A shows the MCM in accordance with one or more embodiments of the invention. As shown in FIG. 7A, the wiring on the bridge chips (104) connects the input path (138) on one level (156) with the input path on the subsequent level (156). Further, the input path (138) from the top level is connected to the input path (138) on the bottom level. In one or more embodiments of the invention, a right-to-left wiring scheme is used in conjunction with a left-to-right wiring scheme. Specifically, each node (160) includes functionality to receive data from the right or from the left. Nodes are described in more detail in FIG. 7B.

As shown in FIG. 7B, each node (160) has two flow control buffers, a left-to-right buffer (162) and a right-to-left buffer (164). The left-to-right buffer (162) receives data from the left-to-right input path (e.g., from $I_i$ (168)). The right-to-left buffer (164) receives data from the right-to-left input path (e.g., from $I_i$ (166)). Data may be written into the flow control buffer using a clock (e.g., $Clk_i$ (170), $Clk_j$ (172)) for each flow control buffer. As shown in FIG. 7B, different clocks (e.g., $Clk_i$ (170), $Clk_j$ (172)) may be used for the left-to-right buffer (162) than the right-to-left buffer (164). $Clk_i$ (170) may be forwarded by $I_i$ (166), and $Clk_j$ (172) may be forwarded by $I_j$ (168). Those skilled in the art will appreciate that in alternative embodiments of the invention, the same clock may be used. Further, a clock (e.g., $Clk_k$ (174)) may define when to obtain data from the flow control buffer (e.g., $B_{LR}$ (162), $B_{RL}$ (164)). In one or more embodiments of the invention, only one of the two flow control buffers (e.g., $B_{LR}$ (162), $B_{RL}$ (164)) is used for the MCM shown in FIG. 7A. The flow control buffer (e.g., $B_{LR}$ (162), $B_{RL}$ (164)) that is used may be dependent on the position of the island chip in the MCM. Returning to FIG. 7B, the control logic (174) defines whether to obtain data from the right-to-left buffer or the left-to-right buffer. The control logic may be an "OR" gate for the MCM shown in FIG. 7A. In another example, the control logic may be a multiplexer or other logical device.

In some embodiments, buffers $B_{LR}$ (162), $B_{RL}$ (164) are implemented with a single buffer and clocks $Clk_i$ (170), $Clk_j$ (172) are selected by multiplexer logic. In some embodiments, one or more clocks are replaced by handshaking signals, such as used in asynchronous logic.

Returning to FIG. 7A, each node receives data from a single input path. The following shows how the connection may be achieved in the four by four crossbar shown in FIG. 7A. Bridge chip $Br_0$ (104A) connects input path A (138A) starting at input port $In_0$ (152A) to $node_{1,1}$ (160F); input path B (138B) starting at input port $In_1$ (152B) to $node_{3,0}$ (160N); input path C (138C) starting at input port $In_2$ (152C) to $node_{2,0}$ (160J); and input path D (138D) starting at input port $In_3$ (152D) to $node_{1,0}$ (160E). Bridge chip $Br_1$ (104B) connects input path A (138A) starting at input port $In_0$ (152A) to $node_{2,2}$ (160L); input path B (138B) starting at input port $In_1$ (152B) to $node_{1,2}$ (160G); input path C (138C) starting at input port $In_2$ (152C) to $node_{3,1}$ (160P); and input path D (138D) starting at input port $In_3$ (152D) to $node_{2,1}$ (160K). Bridge chip $Br_2$ (104C) connects input path A (138A) starting at input port $In_0$ (152A) to $node_{3,3}$ (160R); input path B (138B) starting at input port $In_1$ (152B) to $node_{2,3}$ (160M); input path C (138C) starting at input port $In_2$ (152C) to $node_{1,3}$ (160H); and input path D (138D) starting at input port $In_3$ (152D) to $node_{3,2}$ (160Q).

In the configuration discussed above and as discussed with reference to FIG. 7B, the sizes of the flow control buffers may be different for the right-to-left buffer and the left-to-right buffer. For the left-to-right buffer, the threshold sizes may be $1*T_{unit}*R$, $2*T_{unit}*R$, $3*T_{unit}*R$, and $4*T_{unit}*R$ for each level, respectively, on each island chip (102) based on the path length to the flow control buffer. Specifically, the threshold sizes may be set in a manner similar to the discussion above with reference to FIG. 6.

In one or more embodiments of the invention, each island chip (102) has the following minimum threshold sizes for the right-to-left buffers on each of the nodes. Since only one level 1 (156A) buffer is needed for local loopback, the right-to-left buffers for the level 1 nodes are omitted. Local loopback exists when the flow control buffer receives data from an input port and provides data to the output port that is connected to the same link as the input port. Thus, the threshold size for level 1 (156A) flow control buffers may be set to zero. Although the only right-to-left buffer on level 2 (156B) to receive data is in $node_{1,0}$ (160E), for the purposes of making the island chips (102) identical, the threshold size for the right-to-left buffer for the level 2 (156B) nodes (e.g., node$_{1,0}$ (160E), node$_{1,1}$ (160F), node$_{1,2}$ (160G), node$_{1,3}$ (160H)) may be set to 4*T$_{unit}$*R. Those skilled in the art will appreciate that in alternative embodiments of the invention, when non-identical island chips are used, the threshold size for each of the nodes (160) may be set to the actual distance between the input port (152) and the node (160).

Continuing with FIG. 7A, on level 3 (156C), the threshold size for the right-to-left buffer may be set to 3*T$_{unit}$*R because the longest input paths (138) that provide data for the right-to-left buffer in level 3 (156C) are from input path D (138D) and input path C (138C) and have a round time of 3*T$_{unit}$. On level 4 (156D) the threshold size for the right-to-left buffer may be set to 2*T$_{unit}$*R because the longest input paths (138) that provide data for the right-to-left buffer in level 4 (156D) nodes are from input path B (138B), input path C (138C), and input path D (138D). The round trip time to the buffer from the input port is 2*T$_{unit}$ in accordance with one or more embodiments of the invention.

Although FIG. 7A shows only a crossbar switch having sixteen nodes, the scheme shown in FIG. 7A may be used with more or fewer than sixteen nodes without departing from the scope of the invention. For example, the crossbar switch may have ten rows of nodes and ten columns of nodes. Further, although FIG. 7A shows a configuration in which the bridge chip (104) lowers the first three input paths from the left one level to the right and the top input path on the right to the lowest level on the left, those skilled in the art will appreciate that the reverse configuration may be used. Specifically, the bridge chip (104) may lower the first input path from the left to the lowest level on the right and the first three input paths on the right to the lower levels on the left.

Figure 8A:
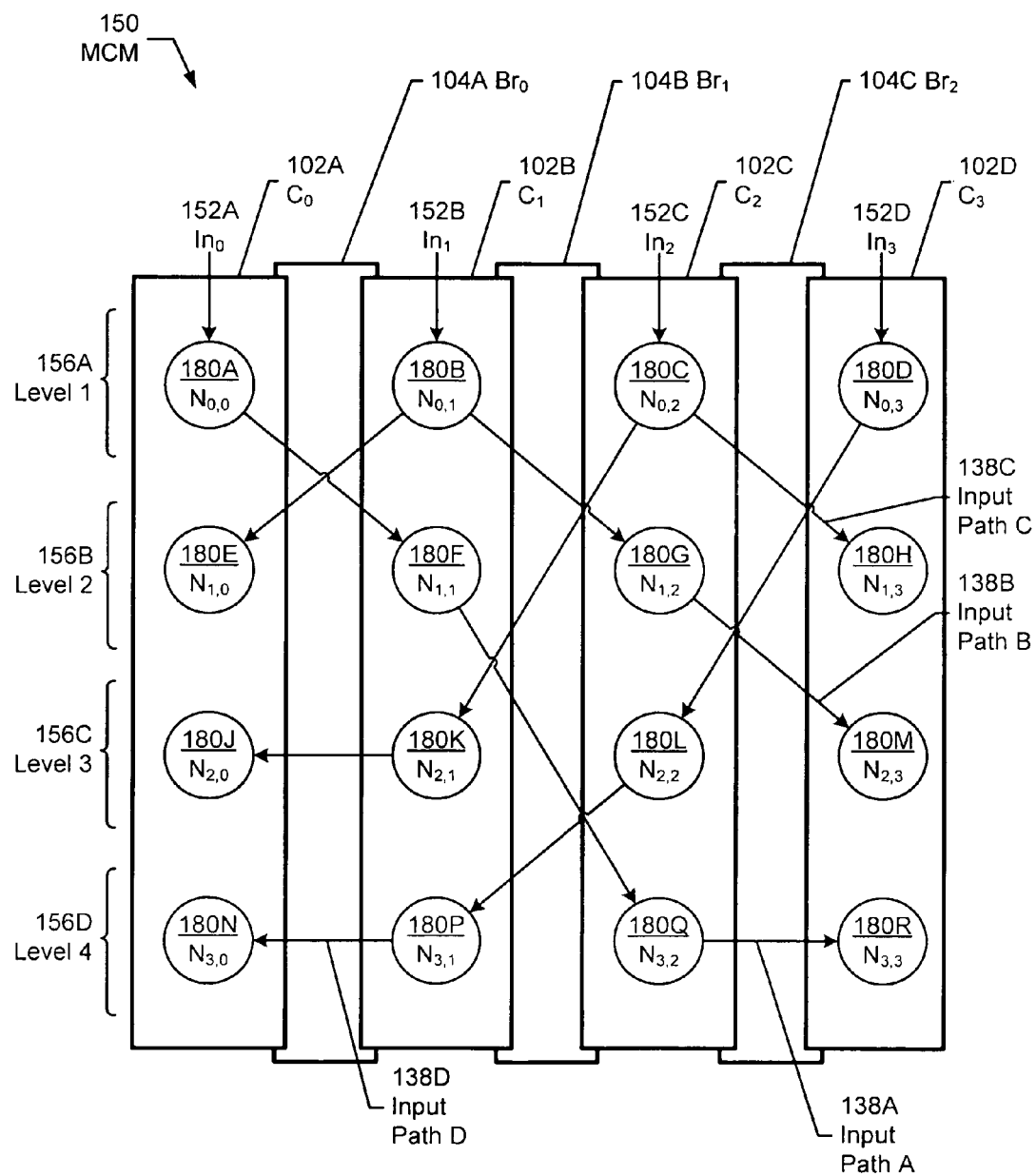
Figure 8B:
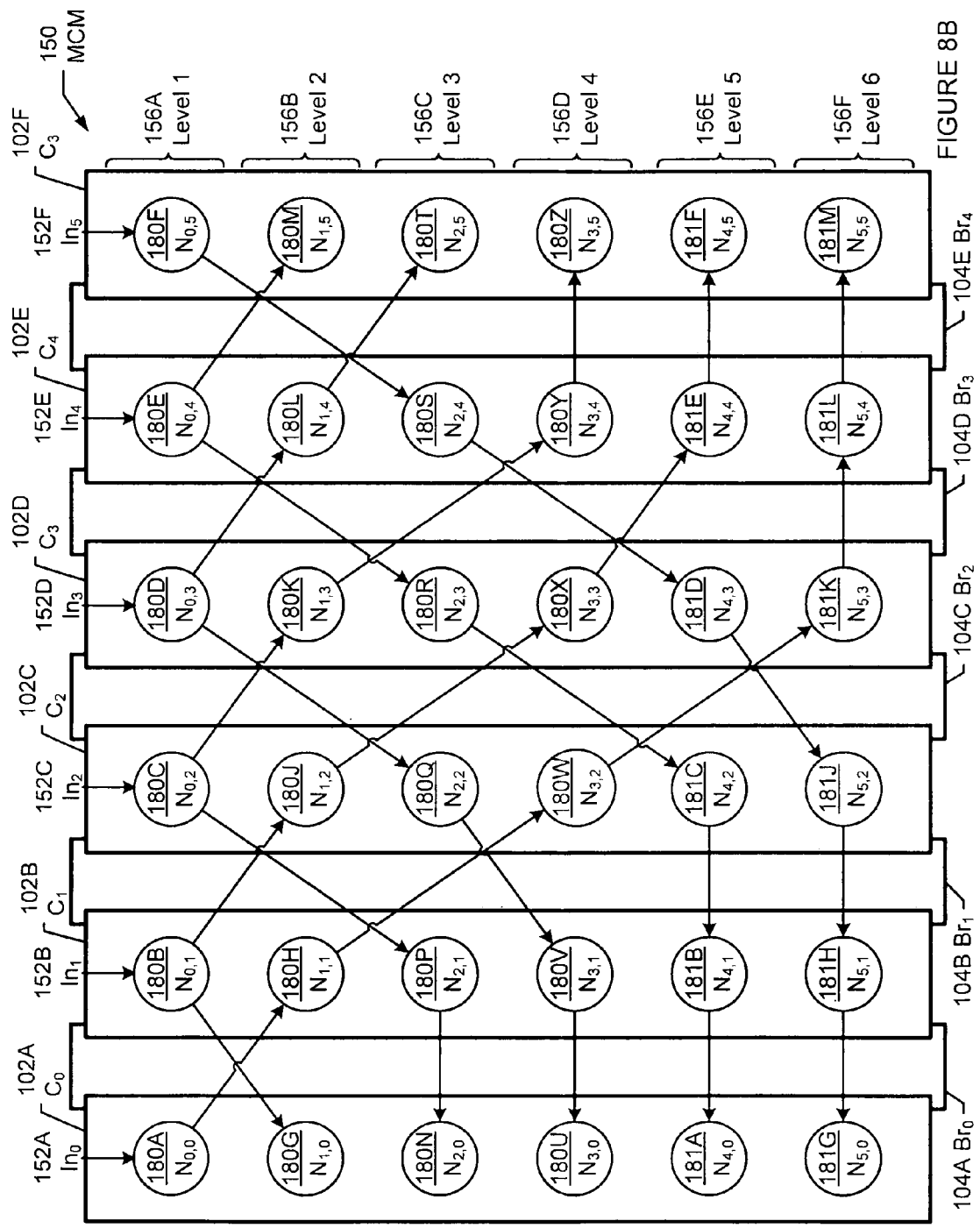

FIGS. 8A-8B show a schematic diagram of a MCM (150) in which programmable wiring is used. FIG. 8A shows a schematic diagram of a sixteen node MCM (150) using programmable wiring. Although FIG. 8A shows only four island chips (102), three bridge chips (104), and four input ports (152) more or fewer island chips, bridge chips, and input ports may be used without departing from the scope of the invention.

Using programmable wiring, each node has only a single buffer in accordance with one or more embodiments of the invention. As shown in FIG. 8A, the input paths from the input ports may flow through the nodes (180) on an island chip (102).

In one or more embodiments of the invention, the nodes on the same island chip have incrementally increased buffer sizes consistent with their level. Specifically, the threshold size of the flow control buffers for each node (180) on the level 1 (156A) may be 1*T$_{unit}$*R. On the level 2 (156B), the threshold size of the flow control buffers for each node (180) may be 2*T$_{unit}$*R. Similarly, the threshold size of the flow control buffers for each node (180) on the level 3 (156C) and level 4 (156D) may be 3*T$_{unit}$*R and 4*T$_{unit}$*R, respectively.

The wiring of the nodes may be programmed such that the above threshold sizes are sufficient to prevent the flow control buffers from exceeding capacity or emptying completely. Specifically, in one or more embodiments of the invention, the wiring is configured such that each input port provides data to a single node on each island chip. When the input path changes from one island chip (102) to an adjacent island chip (102), the input path is lowered by at least one level unless the input path is previously lowered by more than one level. If the input path is previously lowered by more than one level, then the input path may remain on the same level. If the input path is not previously lowered by more than one level, then the input path cannot remain on the same level in accordance with one or more embodiments of the invention. In particular, the number of times that an input path may remain on the same level is based on the number of levels for which the input path was previously lowered.

For example, input path A (138A) starts at input port In$_0$ (152A), through node N$_{0,0}$ (180A) on level 1 (156A) and node N$_{1,1}$ (180F) on the level 2 (156B). At this stage, input path A (138A) lowers two levels to node N$_{3,2}$ (180Q) on level 4 (156D). Thus, input path A (138A) may remain on the same level 4 (156D) to node N$_{3,3}$ (180R). Input path B (138B) starts at input port In$_1$ (152B), through node N$_{0,1}$ (180B) on the level 1 (156A) to node N$_{1,0}$ (180E) and node N$_{1,2}$ (180G) on level 2 (156B). Input path B (138B) may then flow from node N$_{1,2}$ (180G) to node N$_{2,3}$ (180M) on the level 3 (156C). Input path C (138C) starts at input port In$_2$ (152C), through node N$_{0,2}$ (180C) on the level 1 (156A) to node N$_{1,3}$ (180H) on level 2 (156B). Input path C (138C) may also lower two levels from node N$_{0,2}$ (180C) to node N$_{2,1}$ (180K) on the level 3 (156C). Thus, input path C (138C) may remain on the same level 3 (156C) to node N$_{2,0}$ (180J). Input path D (138D) starts at node N$_{0,3}$ (180D) and lowers two levels to node N$_{2,2}$ (180L) at level 3 (156C). Input path D (138D) may continue to lower an additional level to node N$_{3,1}$ (180P) at level 4 (156D) before remaining on the same level 4 (156D) with node N$_{3,0}$ (180N) at level 4 (156D).

As shown in FIG. 8A, the programmable wiring allows for a single flow control buffer per node of a MCM (150) arranged in a vector layout. The above technique may also be used for MCMs (150) having more than sixteen nodes.

FIG. 8B shows a schematic diagram of an MCM (150) with thirty-six nodes. As shown in FIG. 8B, the same schematic for programming the wires may be used to program the MCM (150) with additional nodes. In the example shown in FIG. 8B, buffer sizes of nodes on each level may be set according to the level. For example, the threshold sizes for the flow controls for level 1 (156A), level 2 (156B), level 3 (156C), level 4 (156D), level 5 (156E), and level 6 (156F), may be set to 1*T$_{unit}$*R, 2*T$_{unit}$*R, 3*T$_{unit}$*R, 4*T$_{unit}$*R, 5*T$_{unit}$*R, and 6*T$_{unit}$*R, respectively.

Figure 8C:
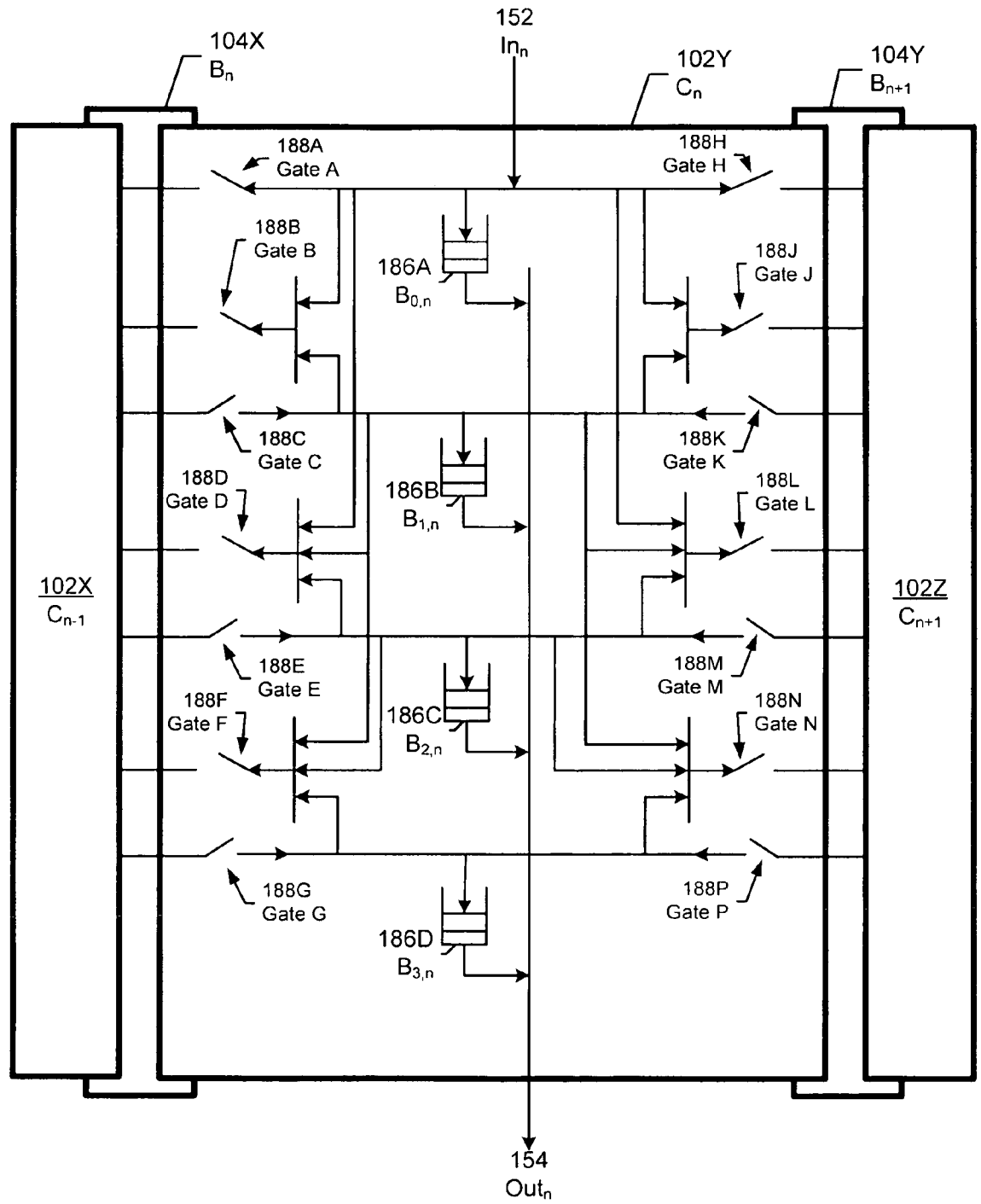

FIG. 8C shows a schematic diagram of an island chip with four flow control buffers (186A, 186B, 186C, 186D) when programmable wiring is used in accordance with one or more embodiments of the invention. As shown in FIG. 8C, an island chip includes flow control buffers (186), wiring (i.e., the lines in FIG. 8C), and gates (188A-P). Signals on the input paths flow to the next island chip according to the gates (188A-P). Specifically, for each level, if gate C (188C), gate E (188E), gate G (188G), respectively, are closed, a signal passes from island chip C$_{n-1}$ (102X) to island chip C$_n$ (102Y). If gate A (188A), gate B (188B), gate D (188D), and gate F (188F), respectively, are closed, a signal passes from island chip C$_n$ (102Y) to island chip C$_{n-1}$ (102X). Similarly, for each level, if gate H (188H), gate J (188J), gate L (188L), and N (188N), respectively, are closed, a signal passes from island chip C$_n$ (102Y) to island chip C$_{n+1}$ (102Z). If gate K (188K), gate M (188M), and gate P (188P), respectively, are closed, a signal passes from island chip C$_{n+1}$ (102Z) to island chip C$_n$ (102Y). Conversely, when a gate is open, the signal may not pass between island chips C$_{n-1}$ (102X), C$_n$ (102Y), and C$_{n+1}$ (102Z). Thus, by programming which gates are open and which gates are closed, embodiments of the invention may define the input paths to each flow control buffer.

The wiring shown in FIG. 8C allows for the input path to be lowered by two levels between island chips (e.g., C$_{n-1}$ (102X), C$_n$ (102Y), and C$_{n+1}$ (102Z)). Additional wiring may be used to allow for the input path to be lowered by more than two levels. Further, although only four flow control buffers are shown in FIG. 8C, additional flow control buffers may be created on an island chip in a similar configuration as the existing wiring and buffers shown in FIG. 8C.

Although FIGS. 5-8C are discussed above with reference to specific arrangements of MCMs, the arrangements discussed above may be mapped onto different layouts. For example, the chips arranged in a vector layout may be mapped onto a matrix layout without departing from the scope of the invention. For example, FIG. 7A, which shows a vector package, may be mapped onto a matrix package or onto a three dimensional package without departing from the scope of the invention. Further, although FIGS. 5-8C show MCMs, the MCMs may be mapped onto multi-chip systems without departing from the scope of the invention. Specifically, the bridge chips may be replaced with any type of connection mechanism for connecting island chips on different packages.

Further, although FIGS. 5-8C show MCMs, embodiments of the invention may be mapped onto implementations using only a single chip. In this arrangement, communication channels (120) in FIG. 3, replicated across a set of inputs and outputs as shown in FIG. 5, would be completely contained in one chip. The latency across a chip varies with the distance between input and output. Thus, in such an arrangement, the flow control buffer sizes may be reduced using the above techniques.

Figure 9A:
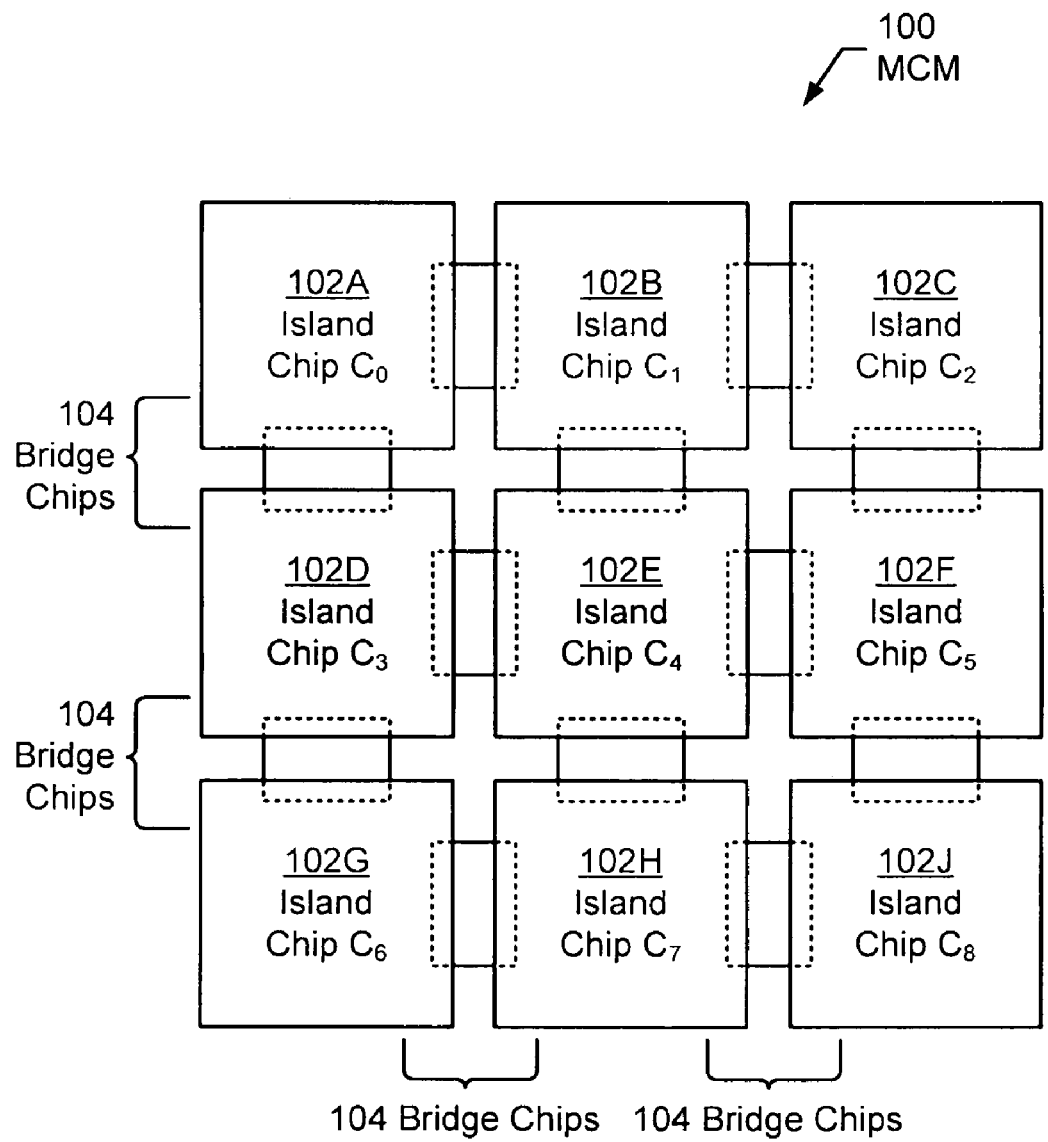

In a MCM arranged in a matrix layout, various schemes may be used to connect island chips when each island chip has a single or multiple input ports. FIGS. 9A-9J show schematic diagrams of a MCM in accordance with one or more embodiments of the invention. FIG. 9A shows an example MCM (100) arranged in a three-by-three matrix. Specifically, three island chips exist per row and per column. Each of the island chips (102) are connected by bridge chips (104). Consider the scenario in which each island chip (102) has a single input port. Further, the interconnection of the island chips (102) and the bridge chips (104) allows data to be transmitted from each input port to each island chip (102). The wiring on specific island chips (102) or bridge chips (104) may be a bus segment. Bus segments that connect a row of island chips form a bus. Similarly, bus segments that connect a column of island chips form a bus. In one or more embodiments of the invention, a bus refers to an interconnect with one source (i.e., an input port) and several destinations (i.e., flow control buffers). A possible implementation inserts amplifiers along the bus to reconstitute and resynchronize the transmitted data. A possible implementation may also insert multiplexing and demultiplexing switches at cross points among abutting ends of horizontal and vertical bus segments. These multiplexing and demultiplexing switches may be programmed so that, for example, the interconnection schemes shown in FIGS. 9B-9J are constructed from horizontal and vertical bus segments connected by these multiplexing and demultiplexing switches.

FIGS. 9B-9J show an interconnection scheme for island chips and bridge chips such that each island chip has a single input port and data from the each input port is transmittable to each island chip in accordance with one or more embodiments of the invention. For the purposes of clarity, the bridge chips are not shown. The island chips are the rectangles in FIGS. 9B-9J. The buses (198) are the thick lines connecting the island chips. Each of the FIGS. 9B-9J shows the buses (198) for connecting each island chip to a single input. The input port corresponding to the buses is on the island chip that is shaded in the figures. In one or more embodiments of the invention, a bus may be a spine bus (198A) or a leaf bus (198B). A spine bus (198A) is a type of bus that connects multiple leaf buses (198B). The island chip having the input port is located at an intersection of a spine bus (198A) and a leaf bus (198B).

For example, in FIG. 9B, the interconnection is configured to connect the input port of the top left island chip to the remaining island chips. FIG. 9C shows the interconnection configured to connect the input port of the top middle island chip to the remaining island chips. FIG. 9D shows the interconnection configured to connect the input port of the top right island chip to the remaining island chips. FIG. 9E shows the interconnection configured to connect the input port of the middle left island chip to the remaining island chips. FIG. 9F shows the interconnection configured to connect the input port of the center island chip to the remaining island chips. FIG. 9G shows the interconnection configured to connect the input port of the middle right island chip to the remaining island chips. FIG. 9H shows the interconnection configured to connect the input port of the bottom left island chip to the remaining island chips. FIG. 9I shows the interconnection configured to connect the input port of the bottom middle island chip to the remaining island chips. FIG. 9J shows the interconnection configured to connect the input port of the bottom right island chip to the remaining island chips.

The interconnection of the island chips and the bridge chips shown in FIGS. 9B-9J provide a mechanism for the number of bus segments on the bridge chips to be the same for connecting island chips that are horizontally situated to one another and vertically situated to one another in accordance with one or more embodiments of the invention. Further, the interconnection allows for the smallest distance between two non-neighboring island chips.

Figure 10:
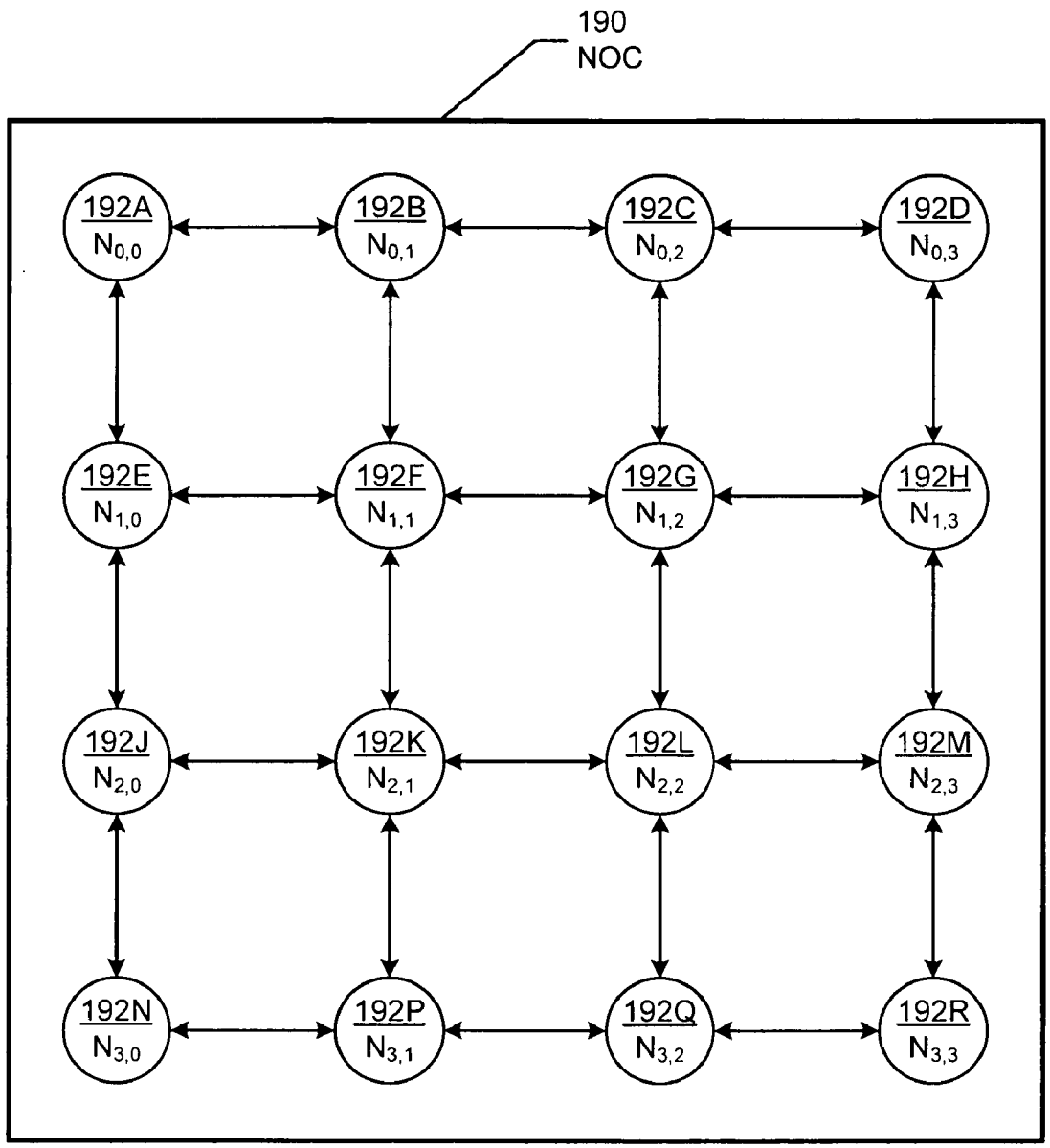

FIG. 10 shows a schematic diagram of a network on chip (NOC) in accordance with one or more embodiments of the invention. Although FIG. 10 shows a sixteen node NOC, more or fewer nodes may exist on the NOC without departing from the scope of the invention.

In the NOC shown in FIG. 10, the nodes (192) are connected in a mesh topology (4-ary, 2-mesh). Specifically, the nodes (192) are arranged in a two-dimensional layout, such that each node (192) is connected to four other neighboring nodes with which the node may communicate. Each node (192) is a component of a chip, such as a processor core, memory, and other such components of a computer system. In one or more embodiments of the invention, each node (192) has a flow control buffer for every other node. For example, in the sixteen node NOC (190) shown in FIG. 10, each node (192) may have fifteen flow control buffers.

The threshold size of the flow control buffers at a receiving node (i.e., a node that receives data) is dependent on the distance between the sending node (i.e., the node that sends data to the receiving node) and the receiving node. In one or more embodiments of the invention, the distance between nodes is the Manhattan distance. The Manhattan distance is the number of adjacent nodes to pass through before reaching the destination node. In one or more embodiments of the invention, the round trip time for adjacent nodes is $T_{unit}$. For example, node $N_{1,1}$ (192F) may have a threshold size $1*T_{unit}*R$ for receiving data from node $N_{2,1}$ (192K) and a threshold of size $4*T_{unit}*R$ for receiving data from node $N_{3,3}$ (192R) based on the round trip time and the Manhattan distance between the nodes. Similarly, for each pair of nodes (192) on the NOC (190), the threshold sizes and correspondingly the buffer sizes of the flow control buffers may be set by identifying the distance between the nodes (192).

Although the description describes sizing flow control buffers for crossbar switches and NOCs, the flow control buffer sizing may be performed for other types of switches and NOCs, and MCMs without departing from the scope of the invention. For example, in one or more embodiments of the invention, sizing the flow control buffers may be performed on a shared memory switch.

Figure 11:
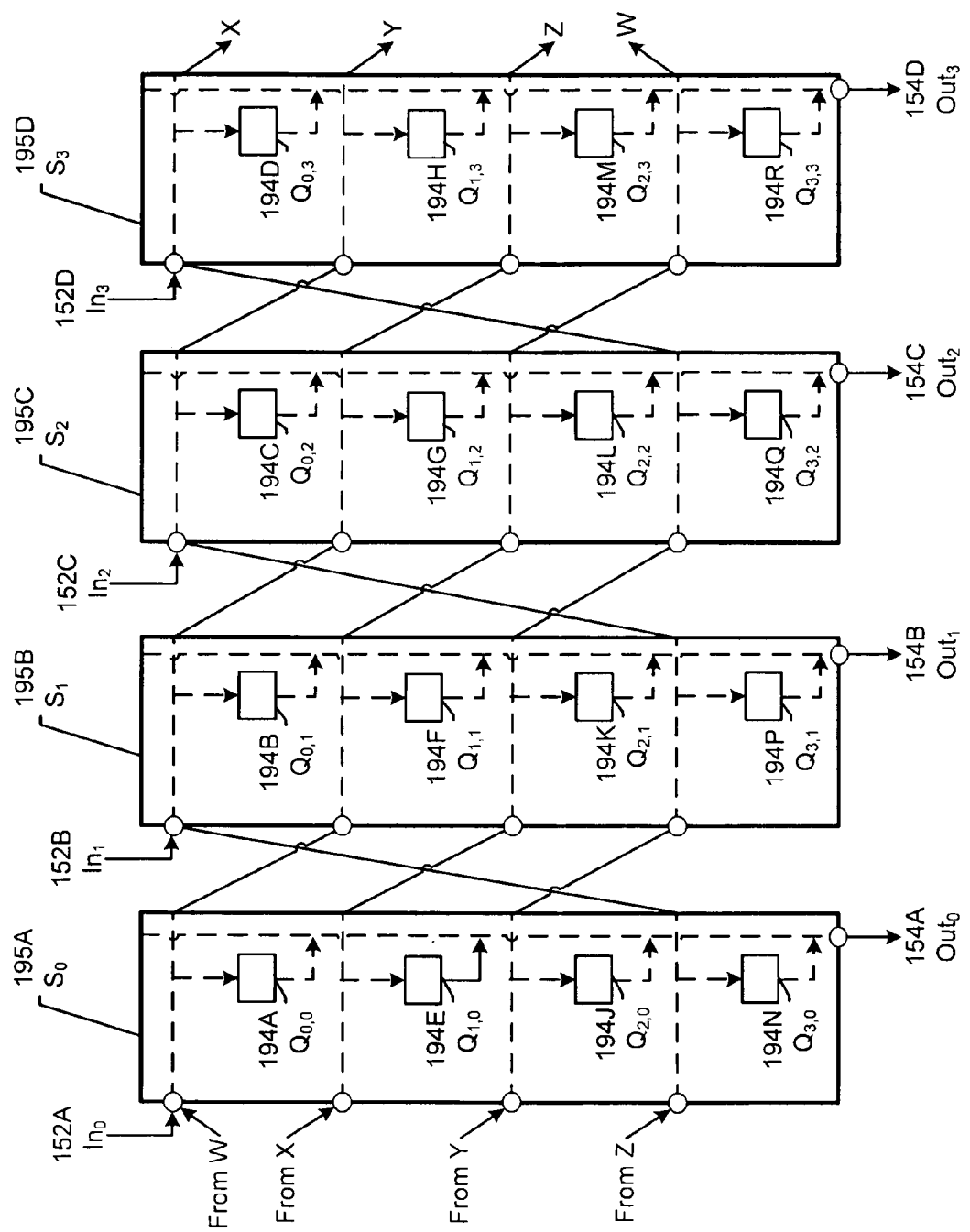

FIG. 11 shows a shared memory switch consisting of four island chips (195) in accordance with one or more embodiments of the invention. A possible MCM topology was shown in FIG. 1A. Although FIG. 11 shows an arrangement of four island chips, more or fewer island chips may be used without departing from the scope of the invention.

An island chip (195) contains a memory that has ports to connect to other island chips, an input port (152) for the entire switch, and an output port (154). In one or more embodiments of the invention, the output port is connected to a memory read port. Each memory may receive data from other island chips or the input port through the memory write ports. The memory write ports are denoted as four circles on the left hand side of each memory. As shown by the dotted lines, the connections within the memory may be logical rather than physical connections. In the memories (195) of a shared memory switch, the flow control buffers are logical queues (194) residing in shared memory. The amount of memory allocated to the logical queues may be calculated in a manner similar to sizing the flow control buffers as discussed above. For example, level 1 queues (e.g., $Q_{0,0}$ (194A), $Q_{0,1}$ (194B), $Q_{0,2}$ (194C), $Q_{0,3}$ (194D)) may have threshold sizes of $1*T_{unit}*R$. Level 2 queues (e.g., $Q_{1,0}$ (194E), $Q_{1,1}$ (194F), $Q_{1,2}$ (194G), $Q_{1,3}$ (194H)) may have threshold sizes of $2*T_{unit}*R$. Level 3 queues (e.g., $Q_{2,0}$ (194J), $Q_{2,1}$ (194K), $Q_{2,2}$ (194L), $Q_{2,3}$ (194M)) may have threshold sizes of $3*T_{unit}*R$. Level 4 queues (e.g., $Q_{3,0}$ (194N), $Q_{3,1}$ (194P), $Q_{3,2}$ (194Q), $Q_{3,3}$ (194R)) may have threshold sizes of $2*T_{unit}*R$. Those skilled in the art will appreciate that the size of the shared memory switch may be larger or smaller than the switch shown in FIG. 11 without departing from the scope of the invention.

Figure 12:
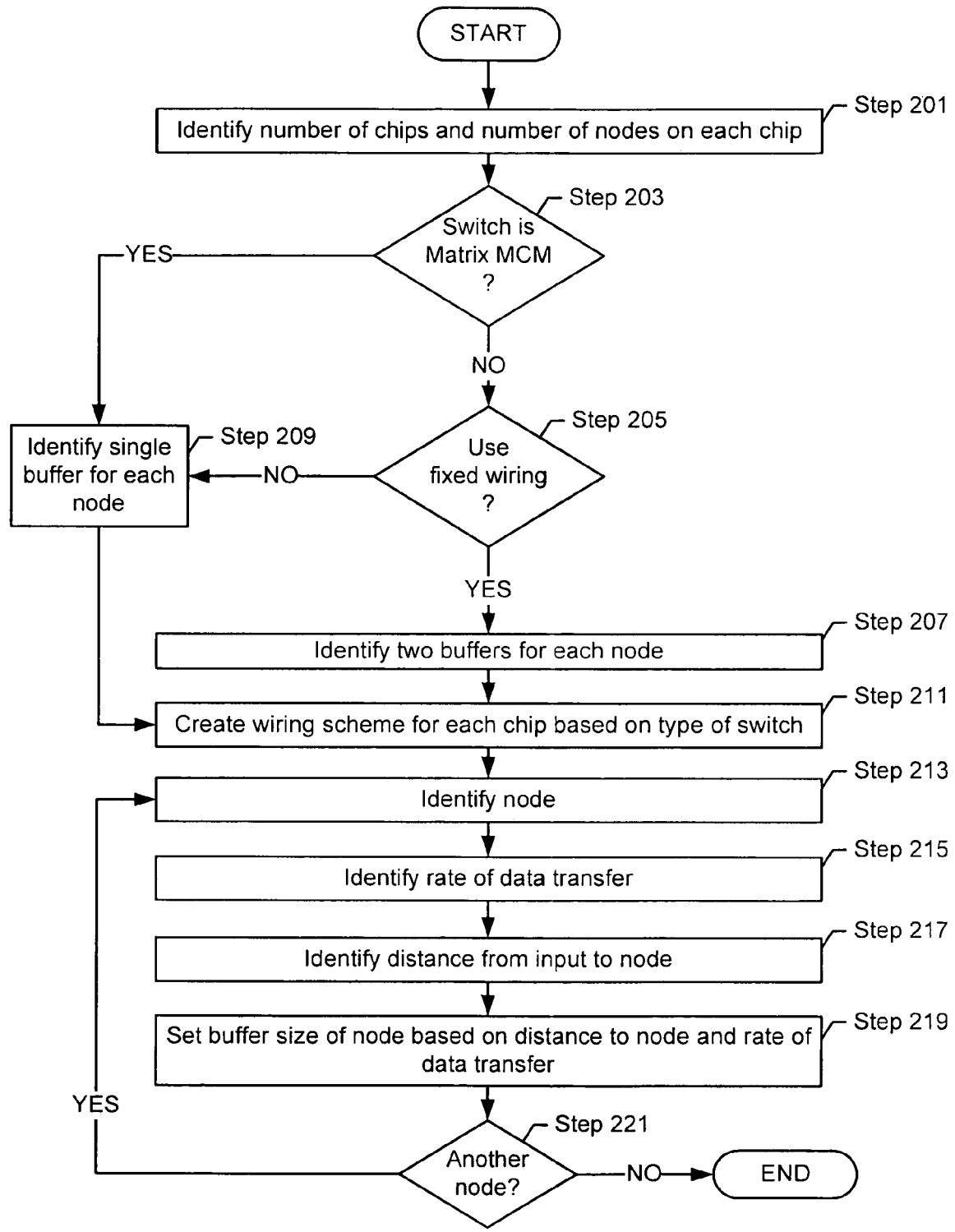
FIG. 12 shows a flowchart in accordance with one or more embodiments of the invention.

FIG. 12 shows a flowchart in accordance with one or more embodiments of the invention. Specifically, FIG. 12 shows a flowchart of a method for setting the size of flow control buffers for each node of a crossbar switch in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel. In addition, steps have been omitted to simplify the presentation.

In step 201, the number of chips and the number of nodes on each chip are identified. In one or more embodiments of the invention, the number of chips and the number of nodes on each chip is based on the desired layout for the crossbar switch. Further in step 203, a determination is made whether the switch is arranged in a matrix layout. As discussed above and in FIGS. 1A-1B, an additional bridge chip exists in a matrix layout that allows for uniform wiring of the crossbar switch. Specifically, each bridge chip may lower the input path by a level.

If the switch is not arranged in a matrix layout, then a determination is made whether to use a fixed wiring scheme (Step 205). If a determination is made to use a fixed wiring scheme, then two buffers for each node are identified (Step 207). Specifically, two buffers (e.g., a left-to-right buffer and a right-to-left buffer) are allocated to the chip.

Alternatively, if the switch is arranged in a matrix layout or if fixed wiring is not used, then a single buffer for each node is identified (Step 209). Specifically, the single buffer may always receive data from the same direction.

In step 211, a wiring scheme for each chip is created based on the type of the crossbar switch. In one or more embodiments of the invention, the wiring scheme is based on whether the crossbar switch is arranged in a ring, a matrix layout, vector layout and whether fixed wiring is used. Specifically, the definition of the wiring scheme may be based on the type of crossbar switch. For example, if fixed wiring is not used, then the wiring scheme for programmable wires may be created even after the chip is fabricated. Alternatively, the wiring scheme may be created when designing the crossbar switch.

In step 213, a node is identified. In one or more embodiments of the invention, a rate of data transfer to the node is identified. In one or more embodiments of the invention, if the rate of data transfer to each node on the crossbar switch is the same, then the rate of data transfer may be identified for the entire chip. Further, in one or more embodiments of the invention, an average rate of data transfer may be used. The average rate of data transfer may be the average of the rate for sending input data, returning control data, transferring between chips, and crossing bridge chips. Alternatively, the rate of data transfer may be based on each leg of the trip between the input port to the node.

In step 217, a distance from the input to the node is identified. Based on the distance, the round trip time for receiving input data and sending control data to the node is identified.

In step 219, the buffer size of the node is set based on the distance to the node and the rate of data transfer. Specifically, as discussed above, the distance and the rate of data transfer may be used to identify the amount of data sent by the input port to the flow control buffer when the flow control buffer sends a signal that the threshold amount of data is exceeded. In one or more embodiments of the invention, the buffer size is set according to the type of flow control used. For example, if the flow control is credit based, then the buffer size may be half the buffer size used for Xon/Xoff flow control.

In step 221, a determination is made whether another node exists. If another node exists, then the method may repeat with step 213. If another node does not exist, then the MCM may be fabricated.

Although the above was discussed with respect to an MCM, a similar method may be used to define the buffer sizes for flow control buffers on a NOC. Specifically, for each node on the NOC, a determination may be made as to the distance and the transfer rate of data between the node and each other node. Based on the distance and the transfer rate of data, the size of the flow control buffer for each other node on the node is defined. The method may repeat for each node of the NOC.

Figure 13:
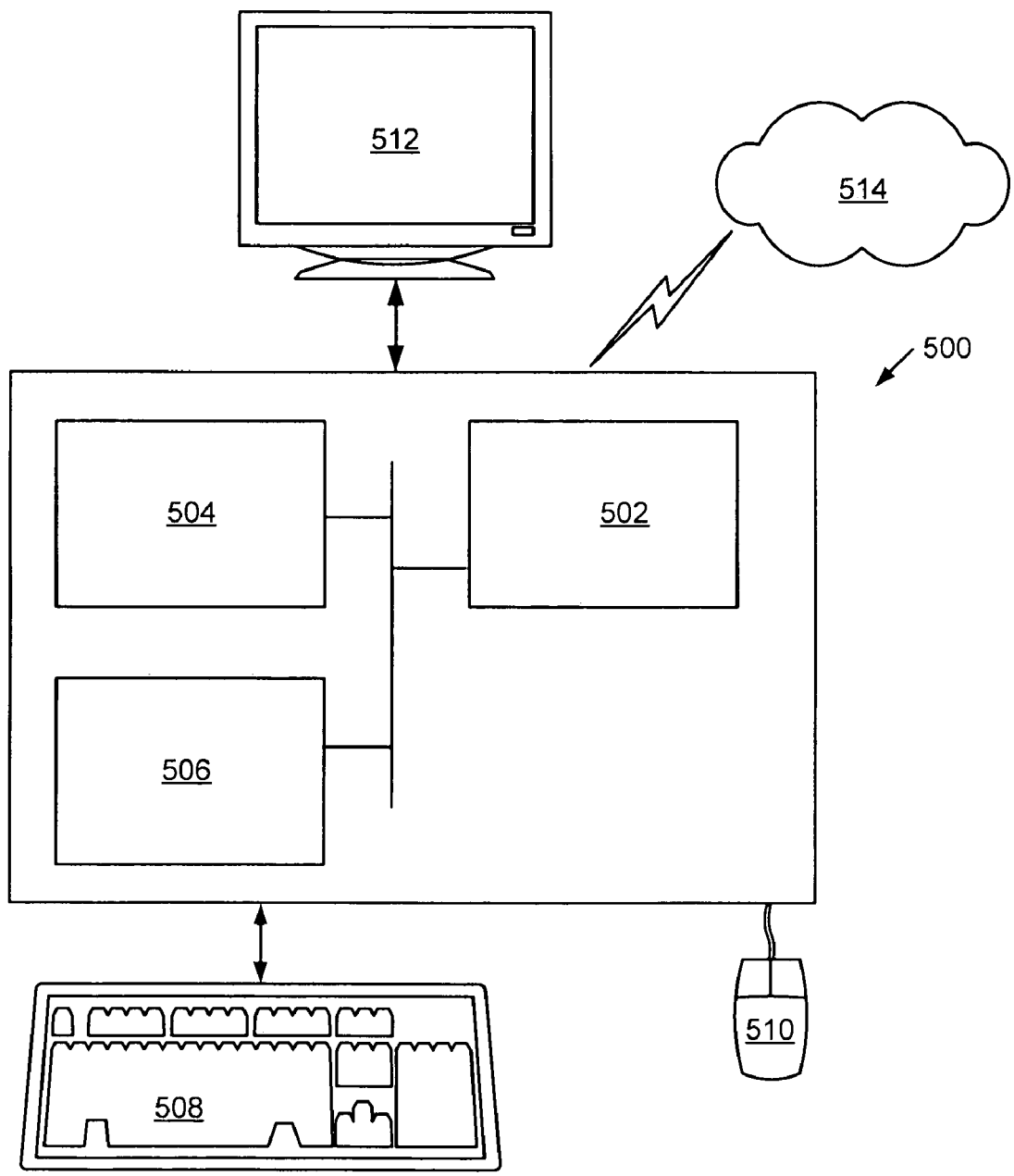
FIG. 13 shows a computer system in accordance with one or more embodiments of the invention.

Embodiments of the invention may be implemented on virtually any type of computer regardless of the platform being used. For example, as shown in FIG. 13, a computer system (500) includes one or more processor(s) (502), associated memory (504) (e.g., random access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer (500) may also include input means, such as a keyboard (508), a mouse (510), or a microphone (not shown). Further, the computer (500) may include output means, such as a monitor (512) (e.g., a liquid crystal display (LCD), a plasma display, or cathode ray tube (CRT) monitor). The computer system (500) may be connected to a network (514) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention.

Further, those skilled in the art will appreciate that one or more elements of the aforementioned computer system (500) may be located at a remote location and connected to the other elements over a network. In one embodiment of the invention, the node corresponds to a computer system. Alternatively, the node may correspond to a processor with associated physical memory. The node may alternatively correspond to a processor with shared memory and/or resources.

Embodiments of the invention size flow control buffers according to the actual usage of the buffer, thereby conserving resources. By sizing flow control buffers according to actual usage, the amount of nodes in the overall design may be increased. Further, in one or more embodiments of the invention, by changing the paths between the input ports and the output ports such that the size of the flow control buffers at the same level are identical, embodiments of the invention allow for the uniform fabrication of the island chips while conserving resources. Specifically, each island chip may be identical. Further, each bridge chip may be identical.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A multi-chip system comprising:
a first island chip comprising a first buffer;
a second island chip comprising a second buffer,
wherein the first buffer and the second buffer are connected to the same input port,
wherein a size of the first buffer is defined by a distance of the first buffer from the input port and a transfer rate of data,
wherein a size of the second buffer is defined by a distance of the second buffer from the input port and the transfer rate of data, and
wherein the distance between the first buffer and the input port is different from the distance between the second buffer and the input port.

2. The multi-chip system of claim 1, further comprising:
a bridge chip connecting the first island chip to the second island chip.

3. The multi-chip system of claim 2, wherein the first island chip is connected to the second island chip using proximity communication between the bridge chip and the first island chip and between the bridge chip and the second island chip.

4. The multi-chip system of claim 1, wherein the first island chip and the second island chip have an identical configuration of sizes of buffers.

5. The multi-chip system of claim 1, wherein the multi-chip system is arranged in one selected from a group consisting of a ring, a vector layout, and a matrix layout.

6. The multi-chip system of claim 1, further comprising:
a first input path from the first chip to the second chip; and
a second input path from the second chip to the first chip.

7. The multi-chip system of claim 6, wherein wiring for the first input path and the second input path is programmable.

8. The multi-chip system of claim 6, wherein wiring for the first input path and the second input path is fixed, and wherein the first island chip comprises a node, wherein the node comprises:
the first buffer for the first input path, wherein the first buffer uses a first output port; and
a third buffer for the second input path, wherein the third buffer uses a second output port, and
wherein the first output port is the same as the second output port.

9. The multi-chip system of claim 1, wherein the multi-chip system is a switch.

10. The multi-chip system of claim 1, wherein the second buffer is at a level at most two levels different from the first buffer.

11. A network-on-chip comprising:
a first node;
a second node; and
a third node comprising:
a first buffer configured to receive data from the first node, wherein a size of the first buffer is defined by a distance to the third node from the first node and a transfer rate of data; and
a second buffer configured to receive data from the second node, wherein a size of the second buffer is defined by a distance to the third node from the second node and the transfer rate of data, and
wherein the size of the first buffer is different from the size of the second buffer.

12. The network-on-chip of claim 11, wherein the first node and the second node on the chip are connected in a mesh topology.

13. The network-on-chip of claim 11, wherein the distance to the third node from the first node is determined by calculating the Manhattan distance.

14. A method for fabricating an island chip of a plurality of island chips comprising:
identifying a rate of data transfer on the island chip;
identifying a first distance to a first node on the island chip, wherein the first node comprises a first flow control buffer;
identifying a second distance to a second node on the island chip, wherein the second node comprises a second flow control buffer, wherein the second distance is different from the first distance;
defining a first size of the first flow control buffer according to the rate of data transfer and the first distance;
defining a second size of the second flow control buffer according to the rate of data transfer and the second distance, wherein the second size is different from the first size; and
creating the island chip with the first node having the first size of flow control buffer and the second node having the second size of flow control buffer,
wherein the plurality of island chips is comprised in a multi-chip system.

15. The method of claim 14, wherein each island chip of the plurality of island chips has an identical configuration of sizes of buffers.

16. The method of claim 14, wherein the multi-chip system is arranged in one selected from the group consisting of a ring, a vector layout, and a matrix layout.

17. The method of claim 14, wherein each node on the island chip comprises a flow control buffer with an incrementally greater size than a node on a preceding level.

18. The method of claim 14, further comprising:

defining a first input path to the first node from a first input port; and defining a second input path to the second node from a second input port.

19. The method of claim 18, wherein wiring for the first input path and the second input path is programmable, and wherein the first input path and the second input path are defined after the chip is created.

20. The method of claim 18, wherein wiring for the first input path and the second input path is fixed, and wherein the wiring for the first input path and the second input path is uniform.

\* \* \* \* \*